(12) United States Patent
Liu et al.

(10) Patent No.: US 12,737,103 B2
(45) Date of Patent: Sep. 15, 2026

(54) GENERATING INTERACTIVE, DIGITAL DATA NARRATIVE ANIMATIONS BY DYNAMICALLY ANALYZING UNDERLYING LINKED DATASETS

(71) Applicant: Adobe Inc., San Jose, CA (US)

(72) Inventors: Leo Zhicheng Liu, Sunnyvale, CA (US); Wilmot Li, San Francisco, CA (US); John Thompson, Atlanta, GA (US)

(73) Assignee: Adobe Inc., San Jose, CA (US)

( * ) Notice: Subject to any disclaimer, the term of this patent is extended or adjusted under 35 U.S.C. 154(b) by 269 days.

(21) Appl. No.: 16/183,353

(22) Filed: Nov. 7, 2018

(65) Prior Publication Data

US 2020/0142572 A1 May 7, 2020

(51) Int. Cl.
*G06F 3/04847* (2022.01)
*G06F 3/0481* (2022.01)
*G06T 13/80* (2011.01)

(52) U.S. Cl.
CPC ........ *G06F 3/04847* (2013.01); *G06F 3/0481* (2013.01); *G06T 13/80* (2013.01)

(58) Field of Classification Search
CPC ...... G06F 3/04847; G06F 3/048; G06T 13/80
See application file for complete search history.

(56) References Cited

U.S. PATENT DOCUMENTS 9,721,321 B1 * 8/2017 Nayeri .................. G06T 11/206
10,169,890 B1 * 1/2019 Bakshi .................. G06T 11/206
11,244,006 B1 * 2/2022 Setlur ................. G06F 16/2465
11,341,705 B1 * 5/2022 Isaacs ..................... G06T 13/80
2013/0009963 A1 * 1/2013 Albrecht ............... G06T 11/206 345/473
2013/0050224 A1 * 2/2013 Gehani ............... G06F 3/04847 345/473

(Continued)

OTHER PUBLICATIONS

YouTube Video: Power BI Custom Visuals—SandDance, Published By Pragmatic Works , Published Date : May 3, 2017 (Year: 2017).*

(Continued)

*Primary Examiner* — Cesar B Paula
*Assistant Examiner* — Zelalem Shalu
(74) *Attorney, Agent, or Firm* — Keller Preece PLLC

(57) ABSTRACT

The disclosure relates to methods, non-transitory computer readable media, and systems that leverage underlying digital datasets corresponding to static graphics to generate digital animated data narratives. In various embodiments, a digital narrative animation system receives static data graphics and a corresponding dataset and generate scenes for the data narrative using the static data graphics. Moreover, in one or more embodiments, the digital narrative animation system presents a storyboard animation user interface for customizing animated transitions between the scenes of the data narrative. Specifically, the digital narrative animation system can use the corresponding dataset to drive the animation transitions between scenes by linking values based on the data attached to each element, showing a different version of the data graphic based on a subset of the dataset, and/or changing the timing of an animation as a function of the data attached to each value.

20 Claims, 23 Drawing Sheets

| Row ID | Country | Year | Population | Continent | Happiness | GDP |
|---|---|---|---|---|---|---|
| 1 | Mongolia | 1967 | 1149500 | Asia | 51.253 | 1226.041 |
| 2 | Venezuela | 1952 | 5439568 | Americas | 55.088 | 7689.799 |
| 3 | Sudan | 2007 | 42292929 | Africa | 58.556 | 2602.394 |
| 4 | Indonesia | 1967 | 109343000 | Asia | 45.964 | 762.431 |
| 5 | Ethiopia | 1972 | 30770372 | Africa | 43.515 | 566.243 |
| 6 | Kuwait | 1992 | 1418095 | Asia | 75.19 | 34932.919 |
| 7 | UK | 1987 | 56981620 | Europe | 75.007 | 21664.787 |

(56) References Cited

U.S. PATENT DOCUMENTS

| | | | | |
|---|---|---|---|---|
| 2014/0043340 | A1 * | 2/2014 | Sobhy | G06F 3/0488 345/473 |
| 2014/0047328 | A1 * | 2/2014 | Ruble | G06F 3/04842 715/256 |
| 2015/0113460 | A1 * | 4/2015 | High | G06F 16/248 715/771 |
| 2016/0132225 | A1 * | 5/2016 | Lee | G06F 16/4393 715/731 |
| 2016/0267700 | A1 * | 9/2016 | Huang | G06F 3/04842 |
| 2017/0076471 | A1 * | 3/2017 | Prophete | G06T 13/80 |
| 2019/0208130 | A1 * | 7/2019 | Hara | H04N 5/04 |
| 2020/0210647 | A1 * | 7/2020 | Panuganty | G06N 3/08 |

OTHER PUBLICATIONS

Casey Reas; Ben Fry; Getting Started with Processing; Published by O'Reilly Media, Inc.; Jun. 2010: First Edition.

Matthew Conlen; Jeffrey Heer; "Idyll: A Markup Language for Authoring and Publishing Interactive Articles on the Web," Proceedings of the 31st Annual ACM Symposium on User Interface Software and Technology, pp. 977-989; Berlin, Germany—Oct. 14-14, 2018.

Russell Goldenberg, An introduction to Scrolllama.js, Nov. 2017, https://pudding.cool/process/introducing-scrollama/.

* cited by examiner

| Row ID | Country | Year | Population | Continent | Happiness | GDP |
|---|---|---|---|---|---|---|
| 1 | Mongolia | 1967 | 1149500 | Asia | 51.253 | 1226.041 |
| 2 | Venezuela | 1952 | 5439568 | Americas | 55.088 | 7689.799 |
| 3 | Sudan | 2007 | 42292929 | Africa | 58.556 | 2602.394 |
| 4 | Indonesia | 1967 | 109343000 | Asia | 45.964 | 762.431 |
| 5 | Ethiopia | 1972 | 30770372 | Africa | 43.515 | 566.243 |
| 6 | Kuwait | 1992 | 1418095 | Asia | 75.19 | 34932.919 |
| 7 | UK | 1987 | 56981620 | Europe | 75.007 | 21664.787 |

502
504
510
508
506
512

518
516
530
520
514

522
526
528
524

532
534
536
538
548
540
542
550
544
546

GENERATING INTERACTIVE, DIGITAL DATA NARRATIVE ANIMATIONS BY DYNAMICALLY ANALYZING UNDERLYING LINKED DATASETS

BACKGROUND

Recent years have seen a significant increase in hardware and software platforms for generating and providing online data narratives. For example, developers have created data narrative systems that generate dynamic visualizations that illustrate underlying data. More particularly, conventional data narrative systems can generate graphs, charts, or other visualizations to reflect trends in data. Moreover, conventional data narrative systems can animate the series of data-based visualizations and associate user controls with the animated visualizations to create an interactive experience.

Although conventional systems can create interactive data narratives, they suffer from a number of technical shortcomings in relation to efficiency, accuracy, and flexibility. For example, conventional systems are often inefficient and require excessive user interaction and time to create individual data narratives. In particular, conventional data narrative systems often require developers to hard-code and individually program new scripts to create visualizations, custom controls, and animated transitions for each customized data narrative. Thus, in order to generate data narratives with customized controls, conventional systems require extensive user interaction. Furthermore, when developing and testing data narrative web animations, conventional systems often require refreshing the page and restarting the data narrative in order to identify changes. This testing process is laborious and time consuming. Thus, creating data narratives with the desired visualization or animation customizations often requires developers to navigate through multiple user interfaces, provide customized coding, and invest excessive time and resources.

Additionally, conventional data narrative systems often produce inaccurate animations within data narratives. For example, many conventional systems create inaccurate animations for objects within the visualizations that jump, skip, or flash during animation. As one example, some conventional systems utilize slideshows that skip between different animations, but are jarring and disruptive and fail to accurately capture the flow of data between animation sequences. This is a significant technological drawback inasmuch as many interactive data narratives are created to accurately animate stories, flows, and changes in relation to digital data, which cannot be conveyed effectively utilizing static digital imagery or inaccurate animations.

Furthermore, conventional data narrative systems are often inflexible. In particular, conventional systems often require designers to write new code (from scratch) each time they create a data narrative. Conventional systems can be inflexible because they often do not provide a streamlined means for editing the order of visualizations and/or altering the accompanying animations. Additionally, conventional systems are often inflexible because they cannot iteratively edit and refine animated data narratives. To illustrate, after designers have coded a given set of animations, conventional systems often require designers to redo low-level authoring work to make modifications (e.g., changing the order of certain visualizations, removing a visualization, etc.). Additionally, conventional systems also rigidly code one data narrative with one particular type of viewer interaction. Thus, conventional systems are often inflexible because they limit the types of user interaction in providing interactive data narratives across client devices.

These along with additional problems and issues exist with regard to generating online interactive data narratives.

SUMMARY

Embodiments of the present disclosure provide benefits and/or solve one or more of the foregoing or other problems in the art with systems, non-transitory computer-readable media, and methods that generate interactive data narratives via a storyboard animation user interface (for interactively generating scenes of a data narrative), animating data-driven transitions between those scenes (e.g., by leveraging digital data bound to each animation object), and exporting the data narratives to a web page with interactive client control. For instance, in one or more embodiments, the disclosed systems can utilize a storyboard animation user interface to generate a sequence of data graphics to create a data narrative. The disclosed systems can generate animations between scenes by using data to drive transitions. In particular, the disclosed systems can transition between scenes by linking values between scenes based on data attached to each graphical element, show different versions of the data graphic based on a subset of the data, and change the timing of animations as a function of the data attached to each graphical element. Furthermore, based on user interaction with selectable design elements, the disclosed systems can dynamically generate web-based data narratives with flexible interactivity controls (e.g., playback, scrollytelling, or stepper controls) that allow client devices to control interactivity with the digital narrative. Thus, the disclosed systems can efficiently, accurately, and flexibly generate and provide interactive online data narratives to client devices.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
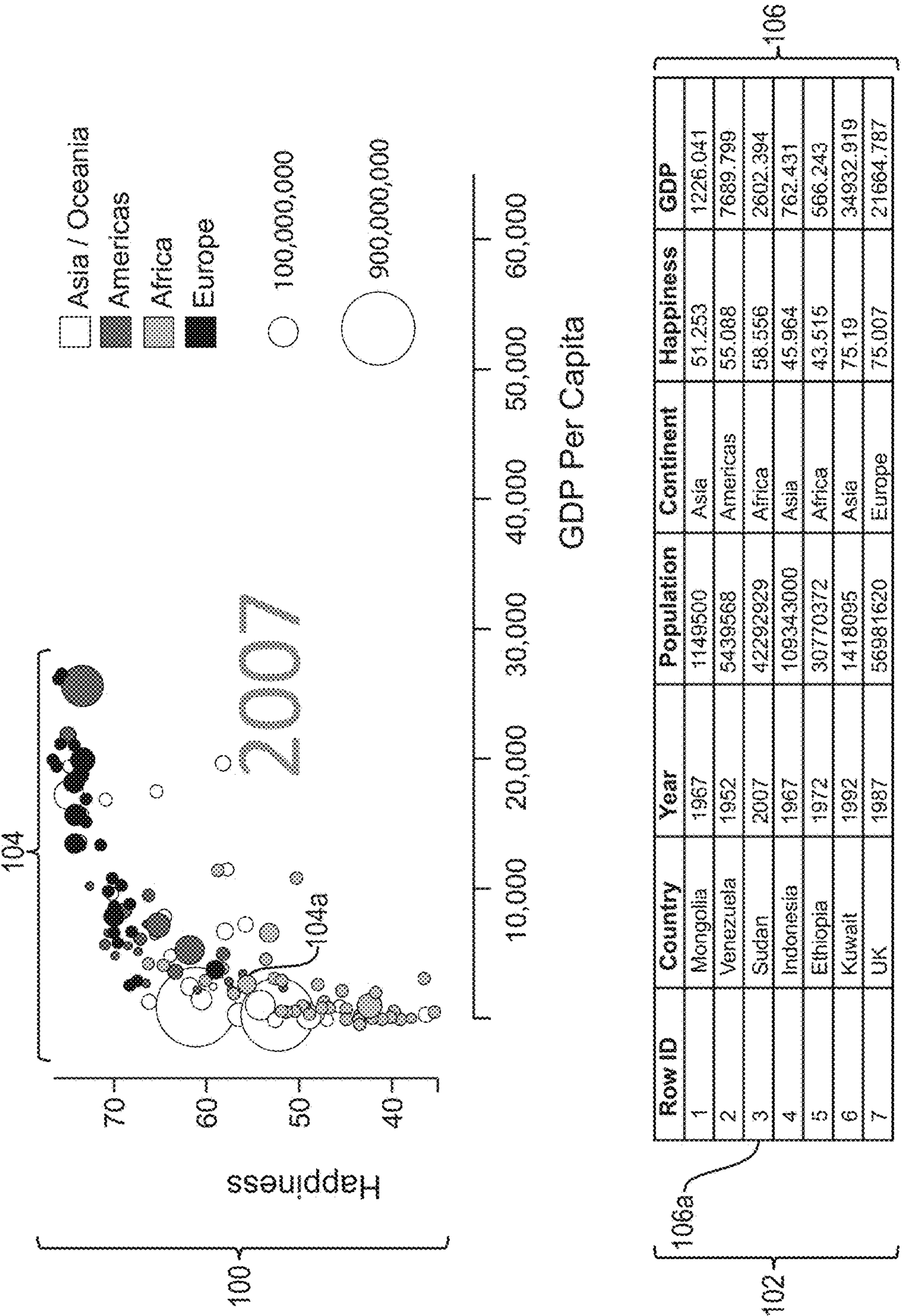
FIG. 1 illustrates an example data graphic and corresponding dataset in accordance with one or more embodiments.

This disclosure describes one or more embodiments of a digital narrative animation system that generates interactive online data narratives via a storyboard animation user interface using data-driven animated transitions. In particular, the digital narrative animation system can animate an interactive data narrative based on a static data graphic and the underlying data. For example, in one or more embodiments, the digital narrative animation system generates, via a storyboard animation user interface, a sequence of data graphic scenes from a static data graphic. Moreover, the digital narrative animation system can create data-driven animations between the data graphic scenes. More specifically, in at least one embodiment, the digital narrative animation system uses the data bound to a particular graphical data element in each data graphic to drive the animation between scenes. Additionally, by accessing and utilizing the underlying dataset, the digital narrative animation system can create animations that show different subsets of the dataset in different scenes. Moreover, in at least one embodiment, the digital narrative animation system also dynamically generates and exports data narratives with different interactive mechanisms (e.g., playback, scrollytelling, and/or stepper controls).

To illustrate, the digital narrative animation system can receive a static data graphic and a corresponding dataset. The digital narrative animation system can present, for display via a storyboard animation user interface at a designer device, a first scene that includes a first data graphic based on the static data graphic and the corresponding dataset. Specifically, the first scene can portray a graphical data element of a first value in a first position. The digital narrative animation system can also display, at the designer device, a second scene that includes a second data graphic based on the corresponding dataset. In particular, the second scene can portray a second graphical data element of a second value in a second position. The digital narrative animation system can also generate a data-driven animation for the transition between the first data graphic and the second data graphic using the corresponding dataset. For example, to generate the transition between scenes, the digital narrative animation system can identify links between the dataset, the first data graphic, and the second data graphic, and generate intermediate graphical data elements in intermediate positions by accessing the first value and the second value from the dataset.

As just mentioned, in one or more embodiments, the digital narrative animation system can identify static data graphics and corresponding datasets. In particular, the digital narrative animation system can access one or more charts, graphs, visualizations, and/or models (e.g., models generated via a data visualization design application) and import them into the digital narrative animation system. Moreover, the digital narrative animation system can access the underlying datasets utilized to generate the static data graphics.

As discussed, in one or more embodiments, the digital narrative animation system generates a storyboard animation user interface and generates scenes based on the data graphic and corresponding dataset. For example, the digital narrative animation system can generate a plurality of data graphics (e.g., from the static data graphic) based on varying values from the underlying dataset. The digital narrative animation system can then display the plurality of data graphics in a plurality of scenes in the storyboard animation user interface. Indeed, as described in greater detail below, the storyboard animation user interface can include a variety of interactive elements for creating and modifying scenes generated from the static data graphics and the underlying dataset.

As mentioned above, the digital narrative animation system can also generate data-driven animated transitions between scenes in a data narrative. In particular, the digital narrative animation system can identify common data graphics across different scenes based on links between the data graphics and corresponding datasets. Moreover, the digital narrative animation system can generate transitions by accessing the underlying datasets to generate intermediate graphical data elements for animating between scenes. Indeed, in one or more embodiments, the digital narrative animation system can generate pre-defined semantic animation transitions which allow designers to describe and implement desired animations at a narrative-focused level that offers flexibility in the face of changes to the data or edits to the narrative itself.

For example, based on the received static data graphic and the corresponding dataset, the digital narrative animation system can link a first data graphic from a first scene with the corresponding dataset to associate scene elements with underlying datasets. Additionally, the digital narrative animation system can identify a link between the second data graphic from a second scene with the corresponding dataset. More specifically, the digital narrative animation system can identify the data attached to each value portrayed in each scene. Thus, the digital narrative animation system can identify, from the data, which values (i.e., which graphical data elements representing values) update between scenes, which values leave the scene, and which values enter the scene.

Based on links between data graphics in different scenes and the corresponding datasets, the digital narrative animation system can generate animations between the scenes. For example, the digital narrative animation system can access a dataset to identify a first value portrayed in a first graphical data element of first scene that transitions to a second graphical data element portraying a second value in a second scene. The digital narrative animation system can generate a transition by determining intermediate graphical data elements based on the first value and the second value. The digital narrative animation system can then present an animation between the first value and the second value by rendering the intermediate graphical data elements. By accessing the underlying dataset, the digital narrative animation system can animate moving, adding, and/or removing values across digital graphics between scenes. For example, the digital narrative animation system can generate a number of pre-defined, data-driven animations including construction, destruction, transition, data ticker, and data highlight animations. Moreover, the digital narrative animation system can determine timing of animations as a function of the corresponding dataset.

Furthermore, the digital narrative animation system can also automatically generate a sequence of data graphic scenes from an initial (e.g., template) scene within a data narrative by using an underlying dataset. For example, a designer can provide user input of a variable data attribute in a dataset, and the digital narrative animation system can generate a series of data graphics and scenes (with transitions) for each sequential data value. Specifically, the digital narrative animation system can access the underlying dataset to determine positions and values for the graphical data elements of each data graphic within each scene as the variable data attribute changes, and then utilize the underlying data to automatically generate transitions between the positions and the graphical data elements for the digital graphic within each scene. Accordingly, with relatively minor user interaction (e.g., selection of a dataset and a single template data graphic), the digital narrative animation system can accurately and flexibly generate an interactive data narrative that illustrates modifications in the data with respect to a variable data attribute.

As mentioned above, the digital narrative animation system can also export data narratives to a website and client devices. In particular, the digital narrative animation system can dynamically generate different interactive mechanisms for how client devices utilize data narratives. For example, the digital narrative animation system can provide, to a designer device, selectable client interactivity elements. Based on user interaction with the client interactivity elements, the digital narrative animation system can automatically export a digital narrative to a website with corresponding interactivity mechanisms. Indeed, the digital narrative animation system (with a click of a button) can generate and modify digital narratives that include scrollytelling, playback, and/or scene stepping interactivity mechanisms in a website.

The digital narrative animation system provides many advantages and benefits over conventional systems and methods. For example, the digital narrative animation system can improve efficiency in generating animated interactive data narratives. Specifically, though many conventional systems require extensive coding in order to create data narratives, the digital narrative animation system generates a storyboard graphical user interface that reduces the number of user interactions, user interfaces, and time needed to generate a data narrative. Indeed, as just described, the digital narrative animation system can import a static digital graphic and corresponding dataset and generate scenes with dynamic transitions for an animation with only a handful of user inputs. In particular, the digital narrative animation system can predefine construction, destruction, transition, data ticker, and data highlight animations. Thus, rather than requiring designers to engage in extensive coding and navigating through multiple pages to create, customize, and test animated data narratives, the digital narrative animation system can efficiently and quickly generate interactive data narratives.

Additionally, the digital narrative animation system improves accuracy relative to conventional systems. For example, by using datasets corresponding to data graphics, the digital narrative animation system can identify common data graphics across scenes and access the underlying data to accurately generate transitions that illustrate modifications, trends, and variations. The digital narrative animation system can, thus, generate transitions between scenes that use the data behind each graphical data element in each data graphic to maintain object permanence and determine which values are entering, exiting, and updating between two data graphic scenes. Thus, the digital narrative animation system uses data bound to each graphical data element to link elements between two transitioned data graphic scenes to accurately generate digital data narratives.

The digital narrative animation system also improves flexibility relative to conventional systems. For example, the digital narrative animation system can flexibly generate a number of scenes or data narratives from a static data graphic and corresponding dataset. For example, based on a data attribute, the digital narrative animation system generate a series of data graphics and flexibly modify the data graphics and transitions. Thus, for a static data graphic and dataset, the digital narrative animation system can generate different data graphic scenes based on various data attributes.

Moreover, as discussed above, in contrast to conventional systems that hard-code individual client interactions, the digital narrative animation system can dynamically and flexibly modify narrative animations to include different interactivity mechanisms. Moreover, the digital narrative animation system can dynamically update data narratives as underlying data changes or updates. For example, in response to receiving additional or modified data in a dataset, the digital narrative animation system can flexibly access the underlying data and generate a modified data narrative to illustrate the additional or modified data. To illustrate, by using pre-defined animated transitions and accessing underlying data, the digital narrative animations system can dynamically adapt authored animation to an edited narrative (e.g., allow previously authored transitions to adapt appropriately to the edited narrative without requiring significant additional authoring work). For example, the digital narrative system can modify the order of scenes and/or data graphics, add scenes and/or data graphs, and remove scenes and/or data graphics with minimal additional authoring time or resources (e.g., removing the need to write custom code or spend extensive amounts of time working with a conventional animation authoring tool).

As illustrated by the foregoing discussion, the present disclosure utilizes a variety of terms to describe features and advantages of the digital narrative animation system. Additional detail is now provided regarding the meaning of such terms. For example, as used herein, the term "dataset" refers to a collection of data. In particular, a dataset comprises related sets of information that can be illustrated by a data graphic. For example, a dataset, can include all or part of an array or database that comprises different values across different data attributes for various samples (e.g., values for population for different countries over samples of time). A dataset can include a number of rows, columns, and data cases. For example, the term "data case" refers to a portion of a dataset. In particular, a "data case" includes a subset of data with a common characteristic or data attribute. For example, in a dataset that includes population changes for different countries over time, the dataset can include a data case of values specific to a particular country.

As used herein, the term "data graphic" refers to a visual representation of data. In particular, a data graphic can include a visualization comprising graphical data elements representative of values in a dataset. For example, a data graphic can include a chart (e.g., pie chart, popsicle chart), graph, or other visual representation. Similarly, the term "static data graphic" refers to a version of a data graphic (e.g., a fixed, specific version of a data graphic received from a data visualization design application).

As used herein, the term "scene" (or "data graphic scene") refers to a digital document (e.g., digital frame or slide) comprising one or more data graphics. In particular, a scene includes a digital document that portrays a data graphic complimentary text, annotations, and/or other media. For example, a scene can include a digital image that includes a plurality of digital graphics and explanatory text.

As used herein, the terms "data value" and "value" refers to an item, component, or entry of a dataset. In particular, a value can include an entry in an array or database. For instance, in a dataset of changing population of different countries over time, a value would include a particular population of a particular country at a particular time. As described in greater detail below, the digital narrative animation system can illustrate a value by plotting the value as a graphical data element (in a data graphic). Indeed, the term "graphical data element" refers to a visual representation of a value from a dataset via a data graphic. The digital narrative animation system can generate data narratives that visualize the movement of graphical data elements portraying values over a series of scenes.

As used herein, the term "data attribute" refers to a variable corresponding to values of a dataset. In particular, "data attribute" can include a category of data values within a dataset. For example, in a dataset of changing population for different countries over time, population, country, and time would each constitute a different data attribute.

As used herein, the term "link" refers to a connection or correspondence between a data graphic (and/or graphical data element) and a corresponding dataset. For example, determining a link between a data graphic and a corresponding dataset can include identifying values in a data graphic (e.g., values corresponding to graphical data elements) that correspond to a dataset. To illustrate, the digital narrative animation system can identify a link between a data graphic and a dataset by determining graphical data elements in a data graphic that reference data cases, data columns, and/or data rows from the dataset. The digital narrative animation system can use the determined links between the data graphic and the corresponding dataset to determine which graphical data elements update between scenes, which graphical data elements leave between scenes, and which graphical data elements enter between scenes.

As used herein, the term "transition" refers to graphical changes between two scenes. In particular, a transition can include a series of graphical data elements in a plurality of intermediate positions (e.g., between positions of values portrayed in two sequential scenes). Additional detail regarding transitions is provided in the figures below.

As used herein, the term "data animation" (or "data narrative" or "digital narrative") refers to a graphical simulation that portrays movement based on variations in underlying data. data-driven animation. In particular, the term data animation includes animated transitions between two scenes (e.g., based on underlying data defining data graphics portrayed in the two scenes). The digital narrative animation system can generate a data narrative using a static data graphic and the corresponding dataset by generating a series of data graphics and animating data-driven transitions between the data graphics. Furthermore, the digital narrative animation system can include interactive controls that allow clients to control the pacing of interactive data narratives.

As used herein, the term "interactive mechanism" refers to a mechanism by which client devices can interactively control a data narrative (e.g., via a website). In particular, the digital narrative animation system can export data narratives as an interactive website using interactive mechanisms that allow clients to control the data narrative. For example, three types of interactive mechanisms include playback control, stepper button control, and scrollytelling control. These types of interactive mechanisms will be discussed in further detail below.

As described above, the digital narrative animation system can use one or more static data graphics and corresponding datasets to generate an interactive data narrative. FIG. 1 illustrates an example data graphic 100 (i.e., a static data graphic) and a corresponding dataset 102. In particular, as illustrated in FIG. 1, the data graphic 100 includes graphical data elements 104. The graphical data elements 104 correspond with values 106 of the dataset 102. More particularly, as illustrated, a first value **106*a* of the dataset 102 corresponds with a first graphical data element 104*a* of the data graphic 100. It will be appreciated that the dataset illustrated in FIG. 1 only portrays a portion of the overall dataset 102. Indeed, the table illustrated in FIG. 1 only illustrates values for seven countries over seven different years, even though the dataset 102** includes multiple values for each country over a multi-year time span.

As illustrated in FIG. 1, the digital narrative animation system determines a link between the data graphic 100 and the corresponding dataset 102. In particular, the digital narrative animation system identifies a link between values in the dataset 102 and the graphical data elements 104. For example, the digital narrative animation system determines that the first graphical data element **104*a* includes a reference (e.g., a link) to a data case or data row that includes the values 106*a* (i.e., the row "3" for "Sudan"). Based on the determined link between the data graphic 100 and the dataset 102, the digital narrative animation system can identify which of the values 106 are portrayed by the data graphic 100. For example, as illustrated in FIG. 1, the digital narrative animation system identifies that the data graphic 100 portrays values for the year 2007. The digital narrative animation system determines that values for other years are not included in the data graphic 100**.

The digital narrative animation system receives the data graphic 100 and the corresponding dataset 102 as input from a designer device associated with a designer. The digital narrative animation system can, based on receiving the data graphic 100 and the corresponding dataset 102, generate new data graphics. For example, the digital narrative animation system can change the axes to move the values to updated positions in a new data graphic. The digital narrative animation system can also change portrayed values and graphical data elements by selecting a different subset of the dataset.

In at least one embodiment, the digital narrative animation system directly imports and stores the dataset 102. In at least one other embodiment, the digital narrative animation system receives the dataset 102 by receiving a location of the dataset 102 on a computing device. The digital narrative animation system can thus access and retrieve values from the dataset 102 in generating a data narrative.

As discussed above, the digital narrative animation system generates a data narrative by animating transitions between data graphic scenes. FIGS. 2A-2D, FIG. 3, and FIGS. 4A-4F describe generating scenes of a digital narrative in accordance with one or more embodiments. Specifically, FIGS. 2A-2D illustrate a series of interfaces for generating a first scene comprising a first data graphic. FIG. 3 describes generating transitions based on underlying datasets. FIGS. 4A-4F illustrate a series of interfaces for generating additional scenes and animated transitions between each scene.

Figure 2A:
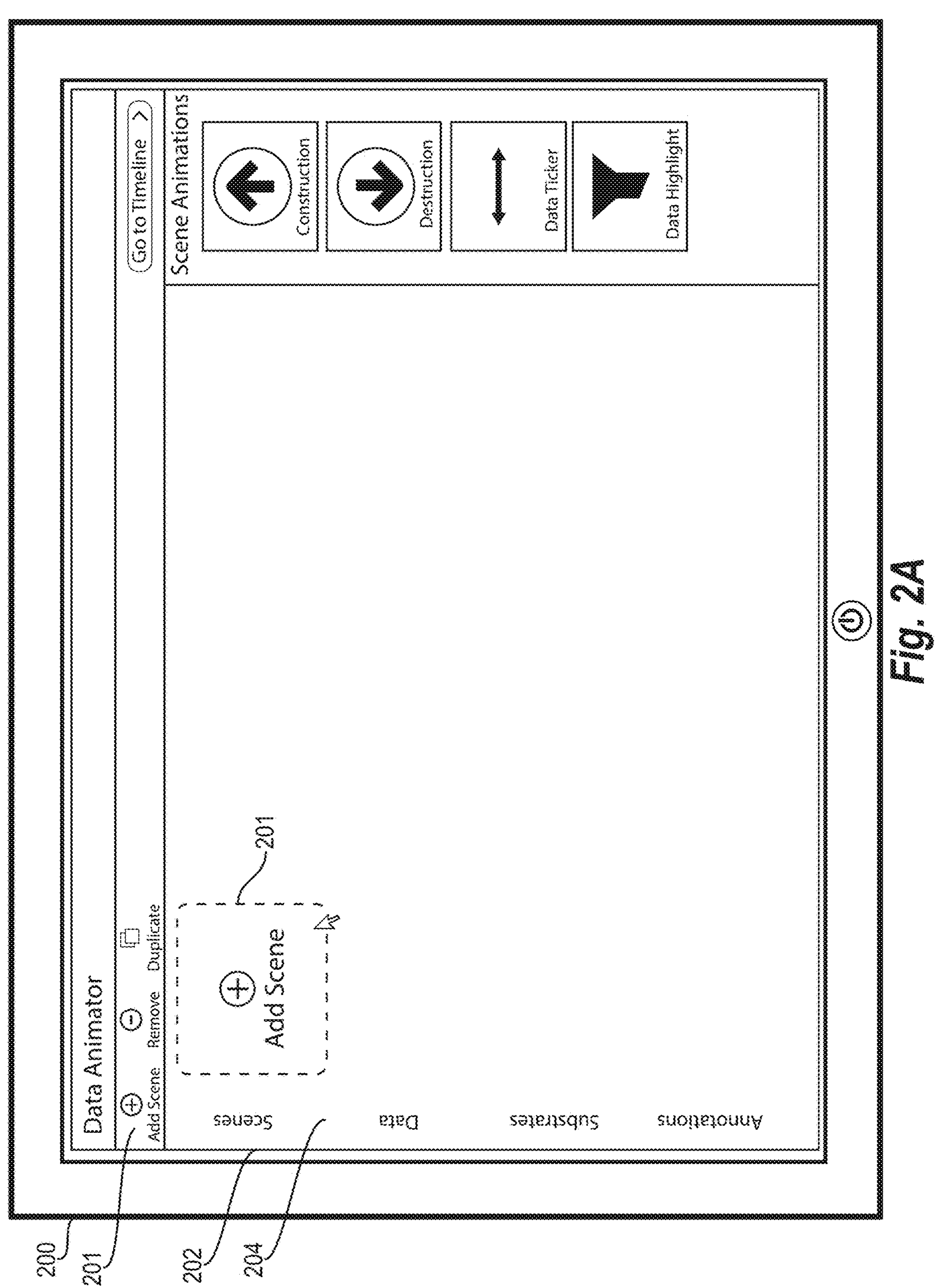
FIGS. 2A-2D illustrate one or more graphical user interfaces for generating a first scene in an animated data narrative in accordance with one or more embodiments.
Figure 3:
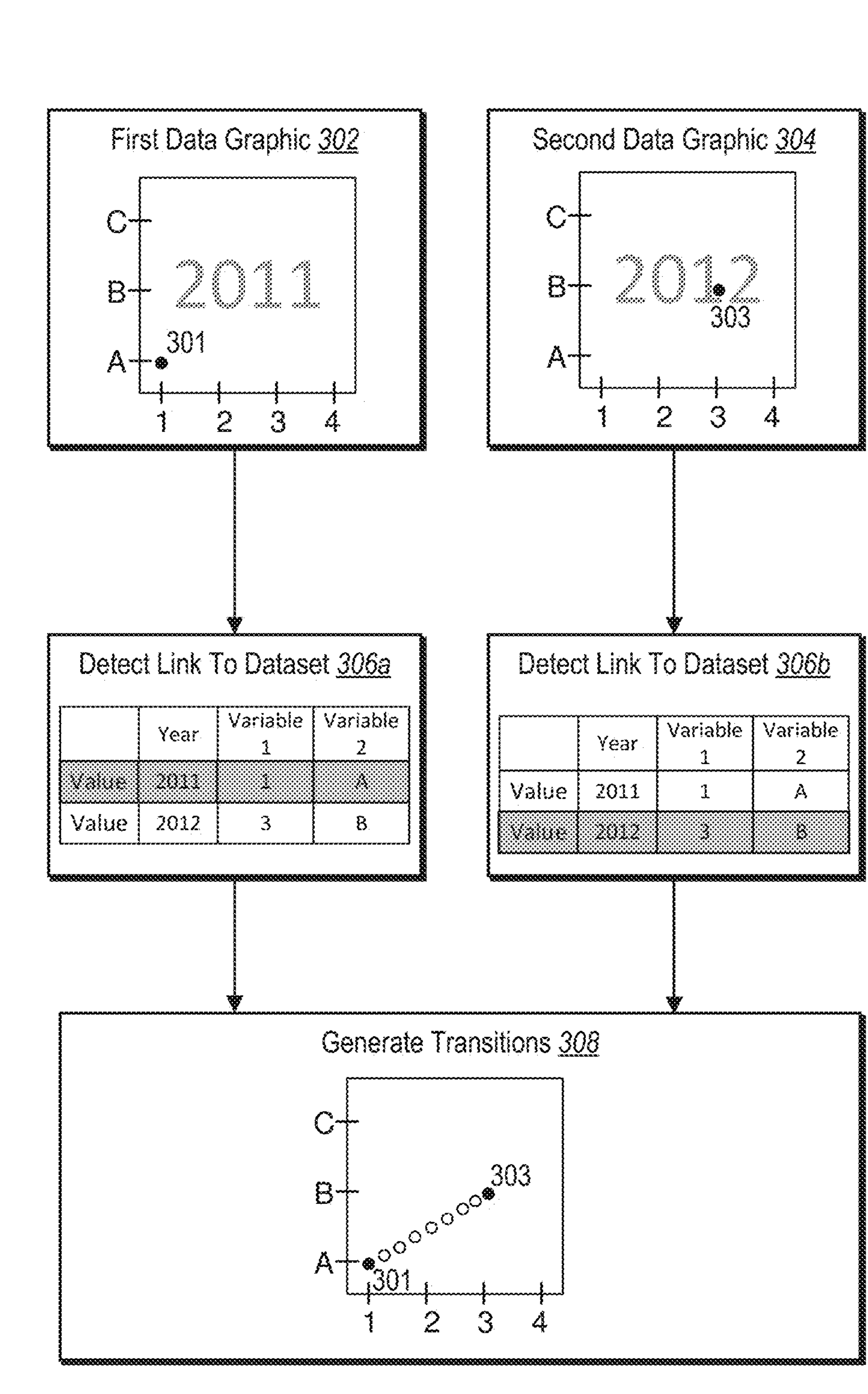
FIG. 3 illustrates a schematic diagram of identifying links between a first scene and a dataset and a second scene and the dataset to generate an animation in accordance with one or more embodiments.

As shown in FIG. 2A, the digital narrative animation system presents a storyboard animation interface 204 via a display screen 202 of a designer device 200. As illustrated, the storyboard animation interface 204 includes add scene elements 201. The designer can select either of the add scene elements 201 to add the first scene to the storyboard animation interface 204.

Figure 2B:
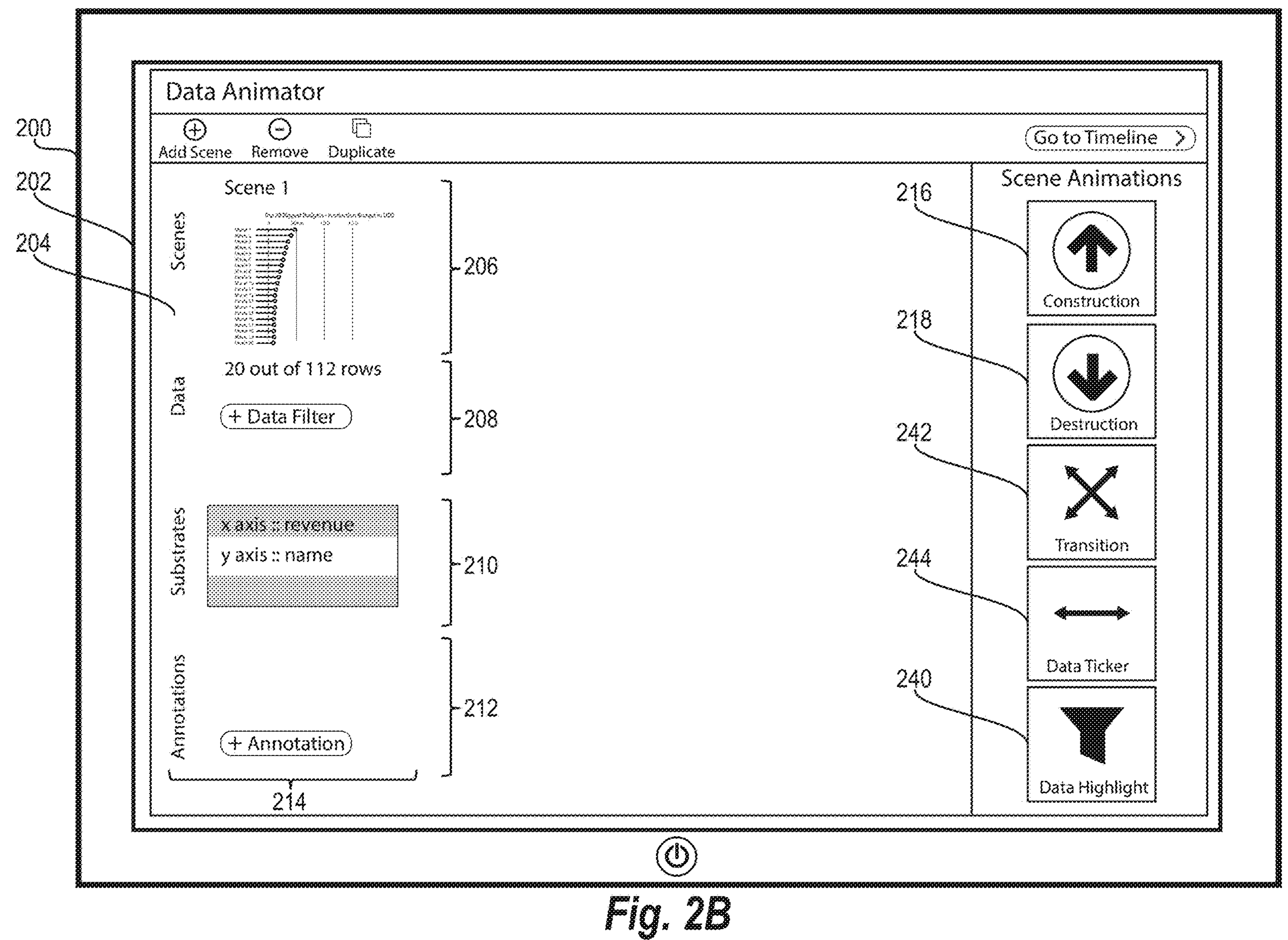

As shown in FIG. 2B, in response to selection of the add scene elements 201, the digital narrative animation system presents the first scene in the data narrative (e.g., upon user selection of a data graphic and dataset). The storyboard animation interface 204 includes a first scene 214 including a first data graphic 206, a first dataset 208 (which can be filtered or revised, as illustrated), a first substrate element 210 (illustrating data attributes displayed in the data graphic 206), and a first annotation element 212 (for adding and/or revising annotation text for the first scene 214). Additionally, as discussed above, the digital narrative animation system can generate a number of predefined data-driven animated animations between data graphics. In particular, the digital narrative animation system includes construction, destruction, transition, data ticker, and data highlight animations. Accordingly, the storyboard animation interface 204 illustrated in FIG. 2B includes a construction element 216, a destruction element 218, a transition element 242, a data ticker element 244, and a data highlight element 240. Each of these elements will be discussed in additional detail below.

The digital narrative animation system can construct first scene 214 based on a static data graphic and/or user input. For example, the digital narrative animation system can identify a static data graphic and dataset (e.g., received from a digital design application) and generate the scene with the static data graphic. In particular, the digital narrative animation system can identify the static data graphic and the dataset, data attributes, and values utilized to generate the graphical data elements within the static data graphic. With this information, the digital narrative animation system can generate the first data graphic 206, the first dataset 208, the first substrate element 210, and/or the first annotation element 212 (e.g., if the static data graphic contains any annotations). In relation to FIG. 2B, the digital narrative animation system accesses and utilizes a static data graphic of a popsicle chart, although the digital narrative animation system can access and utilize a different static data graphic (e.g., the data graphic 102 of FIG. 1).

The digital narrative animation system can also construct the first scene 214 based on user input. For example, the digital narrative animation system can detect entry or modification of one or more data graphics, values, data attributes, or annotations. Based on the user input, the digital narrative animation system can generate or modify the first scene 214.

As mentioned above, the digital narrative animation system can generate animations in a data narrative using predefined animations including destruction, transition, data ticker, data highlight, and construction animations. In particular, the predefined animations are informed by the corresponding dataset. Each of these animations will be discussed below in turn.

The digital narrative animation system can generate a destruction transition in which scenes (and/or graphical data elements) are removed from a data narrative. For example, based on detecting designer interaction with the destruction element 218, the digital narrative animation system can specify the timing for the exit of visual elements in the digital narrative based on the corresponding dataset. The storyboard animation interface 204 illustrated in FIG. 2B also includes the destruction element 218. Based on designer interaction with the destruction element 218, the digital narrative animation system animates the dissolution of a scene. For example, the digital narrative system can animate the dissolution of a scene to a blank canvas at the end of the data narrative or during the data narrative. For cases where the data narrative includes scenes with data graphics that are linked to different data sets, the designer can select and drag the destruction element 218 to the last scene with a data graphic portraying the first dataset. Based on this interaction, the digital narrative animation system animates the dissolution of the last scene. More particularly, the digital narrative animation system can, specify which graphical data elements to remove, the graphical data element properties to change over the course of the destruction animation, and the timing of the destruction animation based on the corresponding dataset.

Additionally, the digital narrative animation system can generate a transition animation. In particular, based on user interaction with the transition element 242, the digital narrative animation system can generate a data-driven transition between data graphics in a digital data narrative. The transition animation and the corresponding transition element 242 will be discussed in additional detail below with respect to FIGS. 4A-4D.

The digital narrative animation system can also generate a predefined data ticker animation. As illustrated in FIG. 2B, based on designer interaction with the data ticker element 244, the digital narrative animation system can generate a data ticker animation. In particular, the digital narrative animation system generates a data ticker animation by assuming that the dataset contains a temporal variable and generates scenes and transitions based on that temporal variable. The data ticker animation will be discussed in greater detail below with respect to FIGS. 7A-7D.

The digital narrative animation system can also generate a data highlight animation in a data narrative. As illustrated in FIG. 2B, based on designer interaction with the data highlight element 240, the digital narrative animation system can highlight graphical data elements to emphasize particular values of the corresponding dataset. For example, the digital narrative animation system can highlight different graphical data elements between two scenes that portray the same subset of data for emphasis. Alternatively, the digital narrative animation system can highlight graphical data elements that represent the same value between two scenes illustrating different subsets of data. For example, where a first scene portrays a first subset of data that includes the value and a second scene portrays a second subset of data that includes the first subset of data and additional data, the digital narrative animation system can highlight the graphical data element associated with the value to emphasize the movement of the value between the first scene and the second scene.

As discussed above, the digital narrative animation system can generate a construction animation in which graphical data elements are introduced into a data narrative. In particular, based on user interaction with the construction element 216, the digital narrative animation system can specify the timing for the appearance of visual elements in the digital narrative based on the corresponding data. As illustrated in FIG. 2B, the storyboard animation interface 204 generated by the digital narrative animation system also includes the construction element 216. Based on designer interaction with the construction element 216, the digital narrative animation system animates the introduction of the first scene 214. For example, upon detection of interaction with the construction element 216, the digital narrative animation system presents a construction animation interface. The digital narrative animation system can generate the construction animation interface 220 based on the designer clicking and dragging the construction element 216 to the first scene 214 or simply clicking on the construction element 216. The predefined construction animation will be discussed in additional detail below with respect to FIGS. 2C-2D.

Figure 2C:
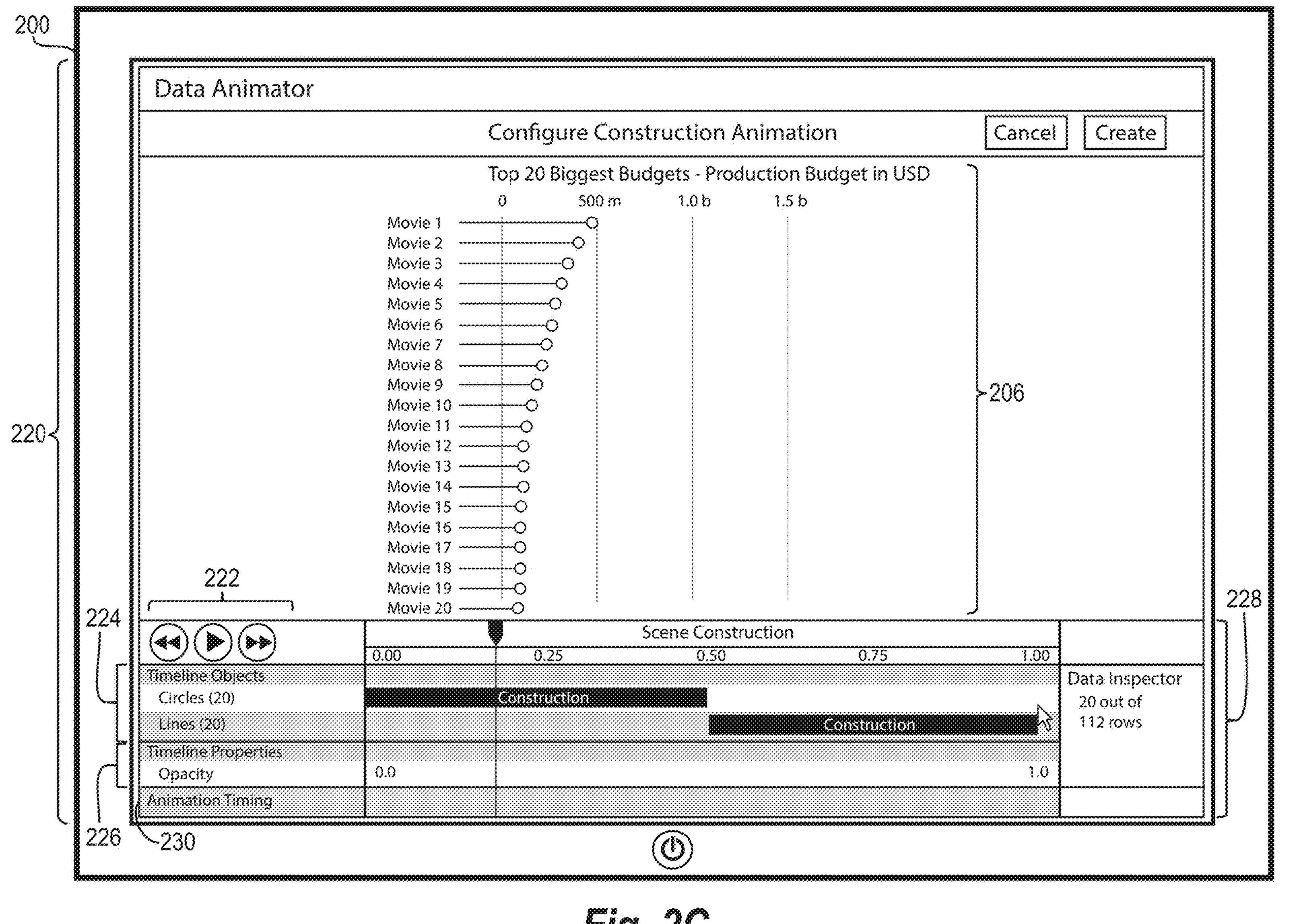

FIG. 2C illustrates a construction animation interface 220. The digital narrative animation system customizes the introduction of the first scene in a data narrative using the construction animation interface. As shown, the construction animation interface 220 includes the first data graphic 206, preview buttons 222, a timeline objects element 224, a timeline properties element 226, a data inspector element 228, and a selectable animation timing element 230.

The digital narrative animation system can, based on designer interaction with elements of the construction animation interface 220, animate the introduction (or construction) of the first scene. In particular, the digital narrative animation system uses the construction animation interface 220 to specify which object will be introduced into the first data graphic 206 over time. As illustrated in FIG. 2C, the first data graphic 206 includes graphical data elements composed of two types of objects—circles and lines. Based on user interaction with the timeline objects element 224, the digital narrative animation system customizes the construction of the objects (e.g., circles and lines) in the first data graphic 206. For example, by manipulating the bars of the timeline objects element 224, the designer can specify that circles enter the scene first between 0.00 and 0.50 seconds and that lines enter the scene second between 0.50 and 1 seconds. Based on this interaction with the timeline objects element 224, the digital narrative animation system constructs the circles before constructing the lines. Additionally, the designer can expand the bars in the timeline objects element 224 to extend the length of time for the construction of the objects. Based on the user interaction with the timeline objects element 224, the digital narrative animation system times the construction of general object types in the first data graphic 206.

Although FIG. 2C illustrates scenes and transitions that are triggered based on passage of time, the digital narrative animation system can utilize other triggers to display scenes or transition between scenes. For example, the digital narrative animation system can utilize scroll events, clicks, or other user input to trigger changes in the digital animation.

Additionally, as illustrated in FIG. 2C, the digital narrative animation system defines the properties of the graphical data elements that change over the duration of the construction animation. In particular, the digital narrative animation system can change different properties of graphical data elements over the duration of the construction animation. In particular, the digital narrative animation system uses the timeline properties element 226 to present a number of visual properties of the timeline objects that the designer can select to animate. For example, some visual properties include opacity, visibility, color, size, position, and others. The timeline properties element 226 indicates that the constructed objects transition from 0.0 opacity to 1.0 opacity over the duration of the construction animation. The digital narrative animation system can also change other properties of graphical data elements. For example, the digital narrative animation system can introduce graphical data elements into the first data graphic 206 by increasing in size, moving into place from a certain location or changing color.

Based on detected interaction with the preview buttons 222 illustrated in FIG. 2C, the digital narrative animation system can generate a construction animation preview. For example, by detecting designer interaction with the play button, the digital narrative animation system can generate a real-time preview of the construction animation. The digital narrative animation system can also fast-forward and rewind the construction animation based on detected designer interaction with the preview buttons 222. Thus, the digital narrative animation system can quickly switch between customizing the construction animation and previewing those changes.

In at least one embodiment, the data inspector element 228 presents a summary of information relevant to the data graphic. In particular, the data inspector element 228 can indicate a relationship between the data graphic and the corresponding dataset. For example, the data inspector element 228 shows that the data graphic portrays a 20 row-subset of data out of the 112 rows of data in the dataset. In at least one other embodiment, the data inspector element 228 can indicate to which dataset the data graphic is linked. For example, the data inspector element 228 can include the title of the corresponding dataset or rows, columns or data cases of a dataset.

Figure 2D:
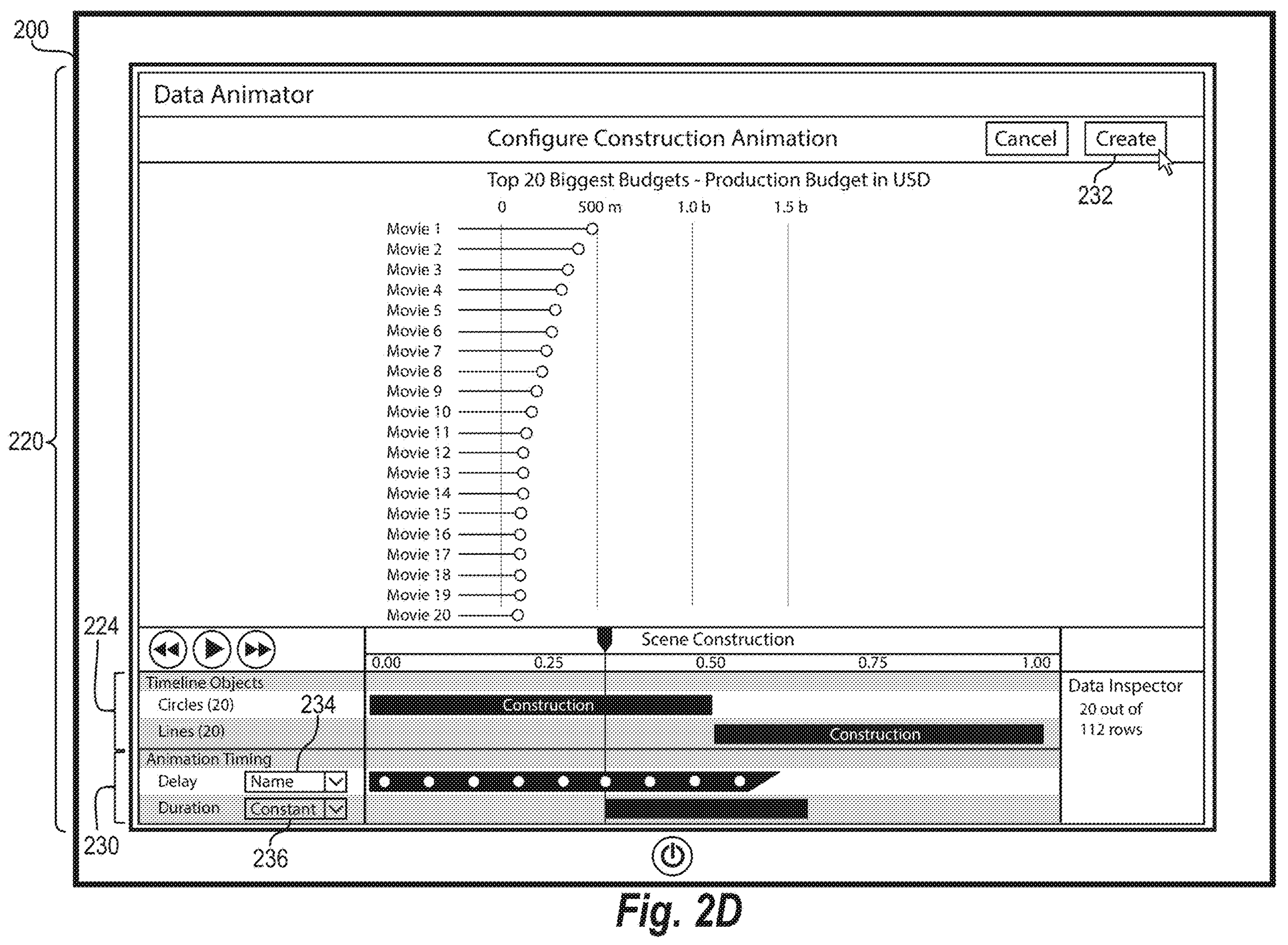

By detecting interaction with the animation timing element 230, the digital narrative animation system expands the animation timing element 230 to customize which dataset values will be introduced into the scene over time. FIG. 2D illustrates the construction animation interface 220 with an expanded animation timing element 230. As illustrated, the expanded animation timing element 230 includes a delay element 234 and a duration element 236.

As illustrated in FIG. 2D, the designer can change the timing of animations based on the corresponding dataset. In particular, the designer can interact with the delay element 234 to identify the data that will dictate the timing of the animations. For example, as illustrated in FIG. 2D, the delay element 234 indicates that the construction animation will be delayed based on names. Based on this interaction, the digital narrative animation system will introduce values based on alphabetical order. As illustrated in FIG. 2D, the delay element 234 comprises a drop-down menu. In one or more embodiments, the digital narrative animation system can also delay animations based on other data (e.g., various data attributes). For example, the digital narrative animation system can delay data based on x-axis or y-axis data (e.g., year, dollar value, etc.).

Additionally, as illustrated in FIG. 2D, the designer can interact with the duration element 236 to alter the duration of the data-driven delays. For example, the duration of a delay for a value can be based on the corresponding value in the dataset relative to graphical data elements portrayed in the first data graphic 206. In at least one embodiment, and as illustrated in FIG. 2D, the duration of the animation can be constant. Thus, rather than varying the animation duration based on a data value, the animation duration can be constant.

In determining animation timing, the digital narrative animation system can access and utilize the dataset underlying the data graphic 206. For example, the digital narrative animation system can access the dataset to determine data attributes, organize data values (e.g., by name as just discussed), and then time a transition based on the data values/data attributes. In this manner, the digital narrative animation system can determine and apply data-driven animation timing.

As discussed above, the digital narrative animation system determines links between static data graphics and the corresponding dataset in order to author data-driven animated transitions between scenes in a data narrative. FIG. 3 illustrates an overview of the digital narrative animation system determining links between data graphics in consecutive scenes and the corresponding dataset and generating transitions based on the underlying data. In particular, FIG. 3 illustrates a series of acts 300 performed by the digital narrative animation system including acts 302-308.

For example, in the act 302 of the series of acts 300, the digital narrative animation system identifies a first data graphic of a first scene (e.g., as described in relation to FIG. 2A). As illustrated, the first data graphic includes a first graphical data element 301 portraying a value at a first position.

As shown in FIG. 3, the digital narrative animation system also performs the act 304 of identifying a second data graphic of a second scene. As illustrated, the second data graphic includes a second graphical data element 303 portraying a second value at an updated position. Although FIG. 3 illustrates a single data graphic in the first scene and a single data graphic in the second scene, it will be appreciated that different scenes can include a plurality of different data graphics (e.g., a plurality of different graphs, charts, or visualizations).

As discussed above, the digital narrative animation system can determine links between data graphics and the corresponding datasets to determine transitions between the data graphics that rely on the same dataset. For example, as illustrated in FIG. 3, the digital narrative animation system performs the act 306*a* of detecting a first link between the dataset and the first data graphic. Moreover, the digital narrative animation system performs the act 306*b* of detecting a second link between the dataset and the second data graphic.

As part of the acts 306*a*, 306*b*, the digital narrative animation system determines that both the first data graphic and the second data graphic portray data from the same dataset. For example, the digital narrative animation system can analyze each data graphic and the underlying dataset to determine particular values, rows, columns, or data cases of datasets that are utilized to generate graphical data elements within each data graphic. By comparing the values, rows, columns, or data cases of datasets utilized in each data graphic, the digital narrative animation system can determine a link between the data graphic (and/or graphical data elements within the data graphic) and individual datasets. Moreover, the digital narrative animation system can compare both datasets linked to each data graphic (and/or graphical data element) to determine that both data graphics are linked to the same corresponding dataset. As just mentioned, as part of the acts 306*a* and 306*b*, the digital narrative animation system can identify the data rows, columns, or cases attached to each graphical data element portrayed in a data graphic. More specifically, the digital narrative animation system binds (e.g., links as part of the graphical data element in the data graphic) data cases of the dataset to each graphical data element. As mentioned above, a data case can consist of one or more rows in a dataset that correspond to a particular object or data attribute.

In relation to FIG. 3, the data narrative animation system determines that the first graphical data element and the second graphical data element are both bound to a common data case (e.g., population data for 2011 and 2012 for the same country). Specifically, the data narrative animation system binds the first graphical data element to the first row of the data case in the dataset illustrated in FIG. 3 and the data narrative system binds the second graphical data element to the second row of the data case in the dataset illustrated in FIG. 3. As shown in FIG. 3, the digital narrative animation system also performs the act 308 of generating transitions (e.g., animated transitions). As mentioned above, the digital narrative animation system determines whether to generate a transition between data graphics and/or graphical data elements based on the determined links. In particular, based on detecting a link to a common dataset between the first data graphic and the second data graphic, the digital narrative animation system can generate a transition between the first data graphic and the second data graphic. Similarly, based on detecting a link to a common data case between the first graphical element and the second graphical element, the digital narrative animation system can generate a transition between the first graphical data element 301 and the second graphical data element 303.

More specifically, the digital narrative animation system can generate transitions where graphical data elements enter, exit, or update between scenes. Each of these determinations will be described in additional detail below in turn. Based on the first and the second link, the digital narrative animation system can determine that a data graphic (and graphical data element) in a first scene correlates to a data graphic (and graphical data element) in the second scene. More specifically, as illustrated in FIG. 3, the digital narrative animation system determines that the first graphical data element 301 and the second graphical data element 303 are bound to common data cases. Based on this correlation, the digital narrative animation system determines to generate a transition that updates position between the first graphical data element 301 and the second graphical data element 303.

Specifically, as illustrated in FIG. 3, the digital narrative animation system generates a plurality of intermediate graphical data elements between the first graphical data element 301 in the first position and the second graphical data element 303 in the updated position as portrayed in the second data graphic. The digital narrative animation system uses the plurality of intermediate graphical data elements to simulate the motion of the graphical data element from the first position to the second position between scenes as described in additional detail with respect to FIGS. 5A-5D. Furthermore, in addition to changes in position, the digital narrative animation system can generate intermediate graphical data elements that transition between updates in color, size, or other properties of the graphical data elements.

The digital narrative animation system can also determine that a graphical data element exits or enters a scene. In particular, in relation to one or more alternative embodiments of elements illustrated in FIG. 3, the digital narrative animation system can determine that the first graphical data element 301 is bound to a different data case than the second graphical data element 303. Based on determining that the first graphical data element 301 and the second graphical data element 303 are bound to different data cases, the digital narrative animation system can generate an exit animation for the first graphical data element 301 and generate an entrance animation for the second graphical data element 303.

In particular, for generating an exit animation, the digital narrative animation system can generate intermediate graphical data elements that animate the graphical data element 301 exiting between scenes. For example, the digital narrative animation decrease the opacity of the first graphical data element 301, move the first graphical data element 301 off the data graphic, or otherwise make the first graphical data element 301 less visible. Specifically, the digital narrative animation system can generate a plurality of intermediate graphical data elements with decreasing opacity or that animate movement toward an exit point. The digital narrative animation system can allow the designer to choose the exit animation.

The digital narrative animation system can also generate an enter animation for the second graphical data element 303. In particular, the digital narrative animation system can increase the opacity of the second graphical data element 303, move the second graphical data element 303 into the data graphic, or otherwise make the second graphical data element 303 more visible (e.g., by generating intermediate graphical data elements with different opacity or in different positions).

Additionally, as part of the act 308, the digital narrative animation system can generate transitions where graphical data elements combine or alternatively break apart. In particular, the digital narrative animation system can determine that corresponding data cases in consecutive scenes contain different numbers of rows of the corresponding dataset. For example, the digital narrative animation system can link a graphical data element in a first scene to multiple rows and link multiple graphical data elements in a second scene to individual rows within the multiple rows. Thus, the digital narrative animation system creates a transition between the first and second scenes by breaking up the graphical data element into the multiple graphical data elements. Alternatively, the digital narrative animation system can combine multiple graphical data elements from a first scene into a single graphical data element of a second scene. For example, the digital narrative animation system can determine that a graphical data element in a second scene is linked to a first data case including multiple rows of data. The digital narrative animation system can determine that the first data case corresponds to multiple data cases linked to multiple graphical data elements in a first scene. Thus, the digital narrative animation system generates a transition in which the multiple graphical data elements from the first scene combine into one graphical data element in the second scene.

Additionally, as part of the act 308, the digital narrative animation system can generate transitions where graphical data elements combine or alternatively break apart. In particular, the digital narrative animation system can determine that corresponding data cases in consecutive scenes contain different numbers of rows of the corresponding dataset. For example, the digital narrative animation system can link a graphical data element in a first scene to multiple rows and link multiple graphical data elements in a second scene to individual rows within the multiple rows. Thus, the digital narrative animation system creates a transition between the first and second scenes by breaking up the graphical data element into the multiple graphical data elements. Alternatively, the digital narrative animation system can combine multiple graphical data elements from a first scene into a single graphical data element of a second scene. For example, the digital narrative animation system can determine that a graphical data element in a second scene is linked to a first data case including multiple rows of data. The digital narrative animation system can determine that the first data case corresponds to multiple data cases linked to multiple graphical data elements in a first scene. Thus, the digital narrative animation system generates a transition in which the multiple graphical data elements from the first scene combine into one graphical data element in the second scene.

The digital narrative animation system can generate the animations in accordance with timing, duration, delay, or property variations. Indeed, the digital narrative animation system can generate intermediate graphical data elements to transition at a certain rate, to last a certain duration, to delay a certain amount, or to include different visual properties (e.g., changes in size, color, or shape).

Figure 4A:
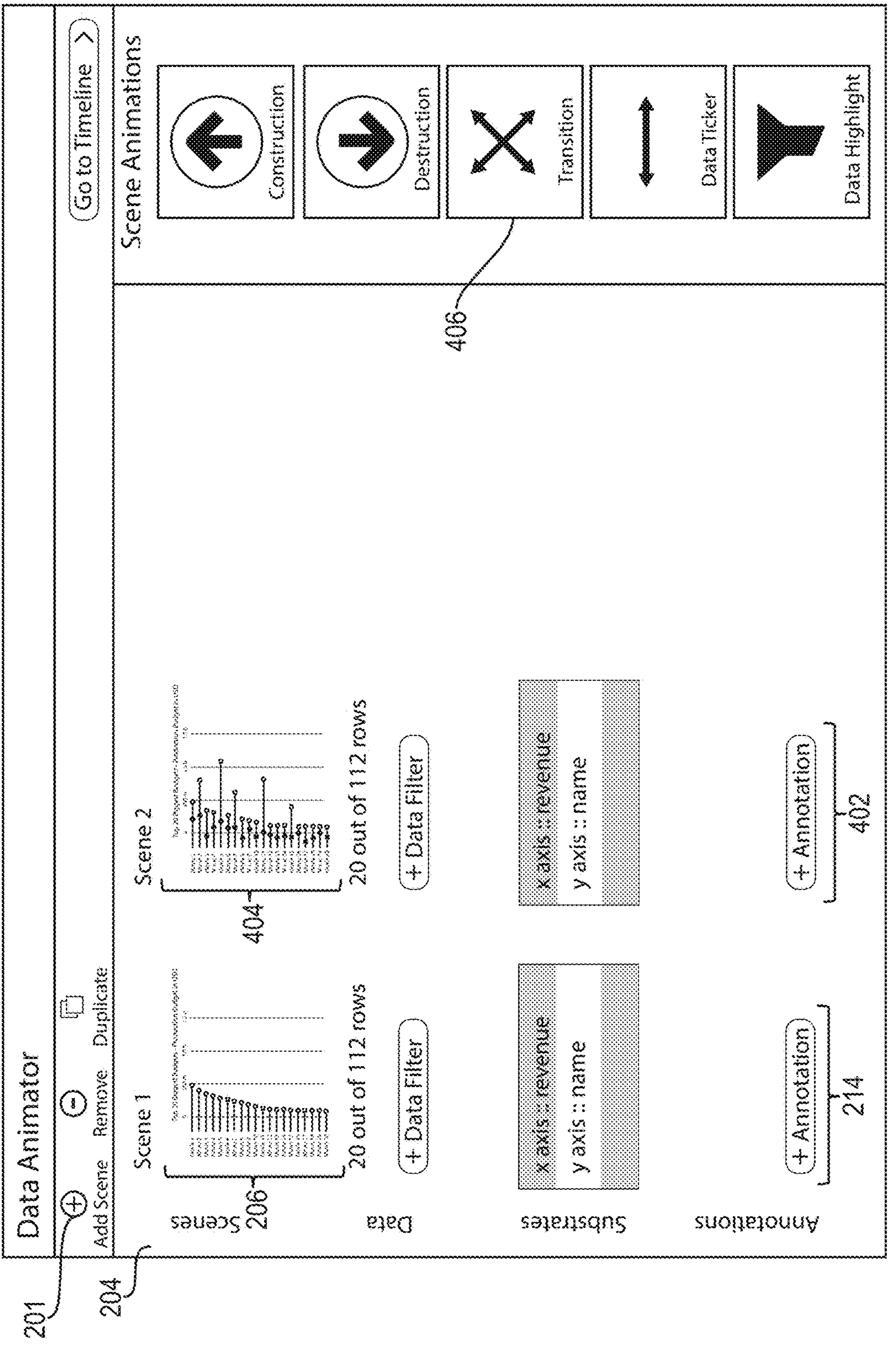
FIGS. 4A-4F illustrate one or more graphical user interfaces for generating additional scenes and transitions between scenes in an animated data narrative in accordance with one or more embodiments.

As mentioned above, the digital narrative animation system can provide one or more user interfaces to assist in generating transitions between scenes in a data narrative. In particular, FIGS. 4A-4E illustrate one or more graphical user interfaces for managing animated transitions between scenes in a data narrative. For example, FIG. 4A illustrates the storyboard animation interface 204. The storyboard animation interface 204 includes the first scene 214 with the first data graphic 206 as well as a second scene 402 that includes a second data graphic 404. Additionally, the storyboard animation interface 204 includes a transition element 406 in addition to the add scene element 201.

Based on detecting interaction with the add scene element 201, the digital narrative animation system adds the second scene 402 to the data narrative. The first data graphic 206 and the second data graphic 404 are based on the same corresponding dataset; however, the first data graphic 206 and the second data graphic 404 differ in appearance. In particular, the second data graphic 404 portrays an additional subset of data that the first data graphic 206 does not include. Additionally, the first data graphic 206 and the second data graphic 404 can have different appearances even though they both portray the same subset of data. For example, the axes on the second data graphic 404 can be different than the axes of the first data graphic 206. Thus, although both data graphics might display the same subset of data, each might portray a particular value in different positions or other modified appearance.

The digital narrative animation system can use different methods to generate the second scene 402. The digital narrative animation system can copy an existing data graphic and modify the underlying data. Alternatively, the digital narrative animation system can receive, from the designer device, a new data graphic associated with the corresponding dataset. For example, the digital narrative animation system can copy the first data graphic 206 and generate the second data graphic 404 by changing data on the axes or displaying a different subset of the dataset. Additionally, the digital narrative animation system can upload a new data graphic provided by the designer as the second data graphic 404. Although FIG. 4 illustrates only a single data graphic in each scene, it will be appreciated that each scene can include multiple different data graphics.

Figure 4B:
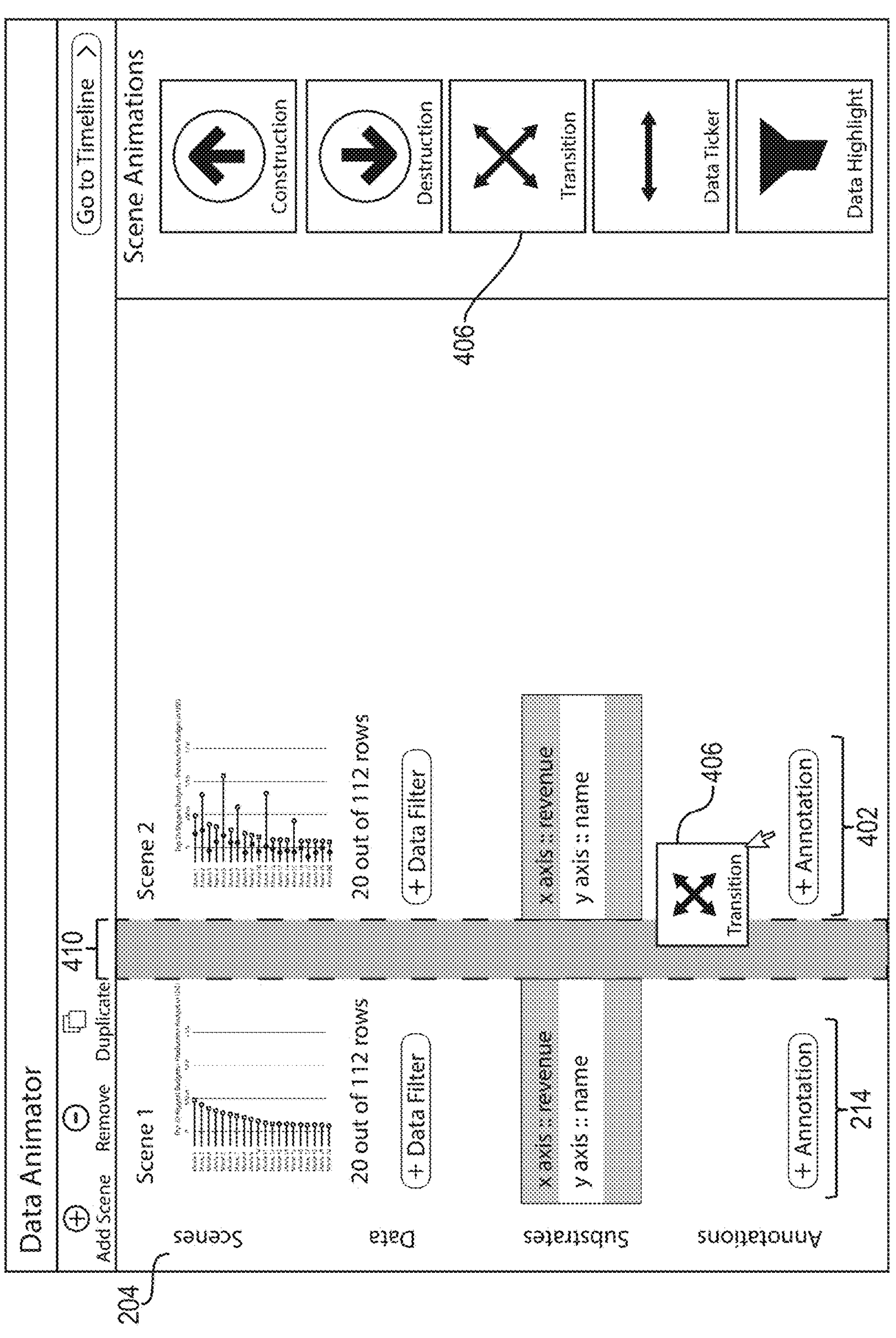

As discussed above, the digital narrative animation system animates transitions between data graphics. For example, as illustrated in FIG. 4B, the designer may select the transition element 406 and, in response, the digital narrative animation system can generate a transition animation interface that allows the designer to manage animation properties. For example, where the storyboard animation interface 204 includes two scenes, as illustrated in FIG. 4B, the designer can select the transition element 406 to customize the animation between the two scenes. Where the storyboard animation interface 204 includes additional scenes, the designer can indicate which transition to animate by dragging the transition element 406 in between the desired scenes. As illustrated in FIG. 4B, the designer drags the transition element 406 to a border area 410 between the first scene 214 and the second scene 402. In response, the digital narrative animation system generates a transition animation interface for the first scene 214 and the second scene 402.

Figure 4C:
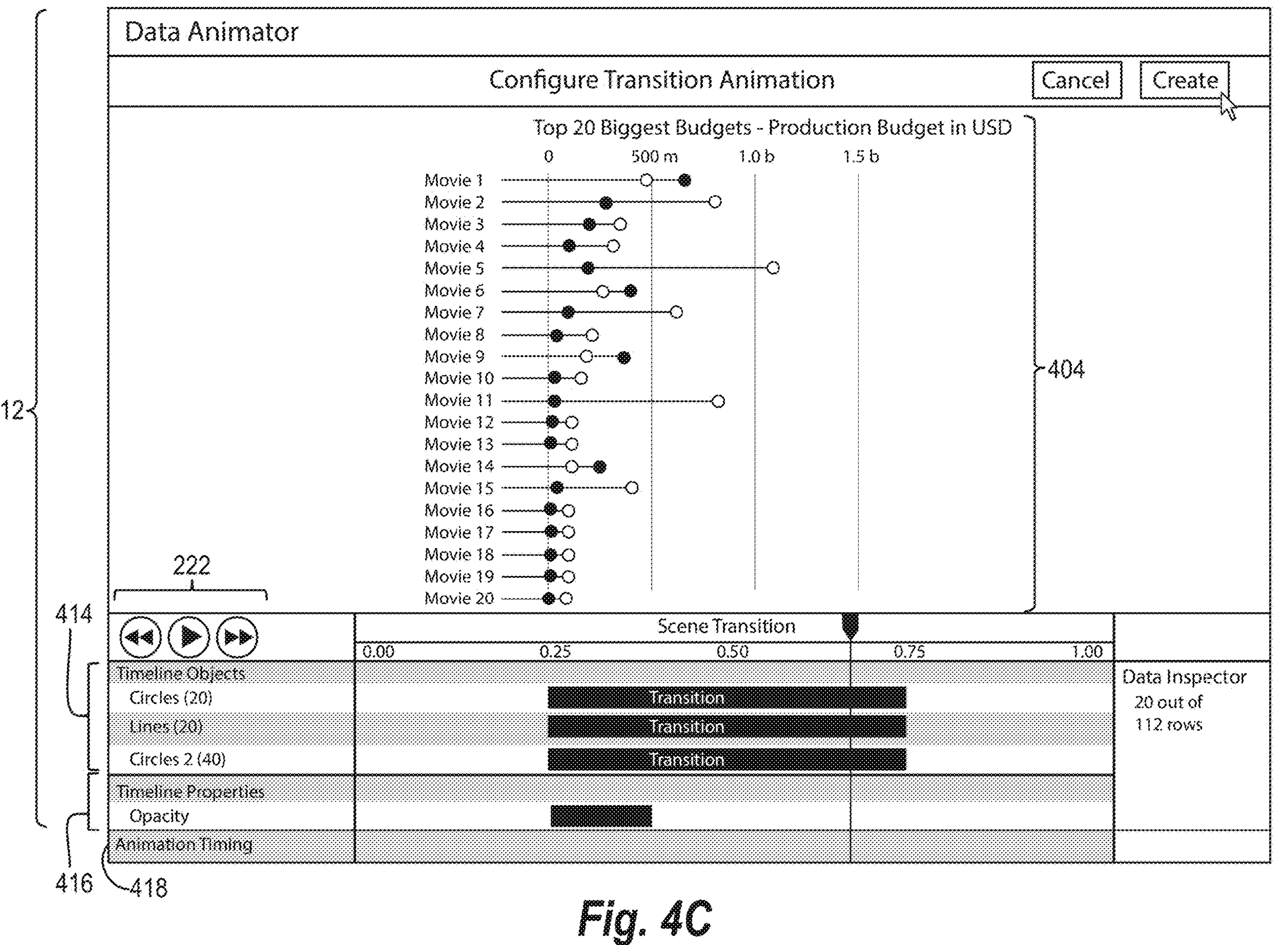

After the designer selects or drags the transition element 406, the digital narrative animation system generates the transition animation interface. FIG. 4C illustrates the transition animation interface 412, which is similar to the construction animation interface 220 illustrated in FIG. 2C. In particular, the transition animation interface 412 includes the second data graphic 404, transition timeline objects element 414, transition timeline properties element 416, and transition animation timing element 418. Though many features of the transition animation interface 412 are similar to features of the construction animation interface 220, the transition animation interface 412 includes additional features that facilitate animating transitions between two scenes.

As discussed in FIG. 3, the digital narrative animation system can generate the transitions illustrated in FIG. 4C based on determining links between the data graphics (e.g., the graphical data elements) and underlying datasets. For example, the digital narrative animation system can determine that some circles/lines between scenes are linked to common data cases. For these circles/lines, the digital narrative animation system can access the underlying dataset and generate intermediate graphical data elements to transition between positions. For other circles/lines, the digital narrative animation system can access the underlying dataset and determine that they are not linked to common data cases. For these circles/lines the digital narrative animation system can generate intermediate graphical data elements to exit (where the underlying values from the dataset are no longer used in the second scene) or enter (where the underling values from the dataset are added in the second scene) during the transition.

As illustrated in FIG. 4C, the digital narrative animation system presents the transition timeline objects element 414. The designer can interact with the transition timeline objects element 414 to order the animations for values from each data graphic. For example, as illustrated in FIG. 4C, the designer can interact with the transition timeline objects element 414 to order animations for the circles and lines from the first data graphic 206 (e.g., circles illustrated as "Circle (20)") and also circles and lines from the second data graphic 404 (e.g., circles illustrated as "Circles 2 (40)"). As illustrated in FIG. 4C, the animated transition for the values for the first data graphic 206 and the second data graphic 404 occur in the same timeframe. Alternatively, the designer can interact with the transition timeline objects element 414 to transition graphical data elements in different orders, at different rates, or at different times.

The transition animation interface 412 of FIG. 4C also includes the transition timeline properties element 416. Based on user interaction with the transition timeline properties element 416 the digital narrative animation system can modify properties of the values within the scene. The transition timeline properties element 416 functions similarly to the timeline properties element 226 described above with respect to FIG. 2B.

The transition animation interface 412 of FIG. 4C also includes the transition animation timing element 418. The transition animation timing element 418 functions similarly to the animation timing element 230 described above with respect to FIG. 2D. In particular, in response to a designer selection of the transition animation timing element 418, the digital narrative animation system expands the transition animation timing element 418. In particular, the expanded transition animation timing element 418 allows the designer to select data that will dictate the data-based timing of animated transitions. The digital narrative animation system can use the data to dictate the timing of exit animations, update animations, and entrance animations for a first set of values portrayed in the first data graphic 206 and/or a second set of values portrayed in the second data graphic 404. For example, the designer can choose to delay exit animations using one variable, delay transition animations using a second variable, and delay entrance animations using a third variable.

Figure 4D:
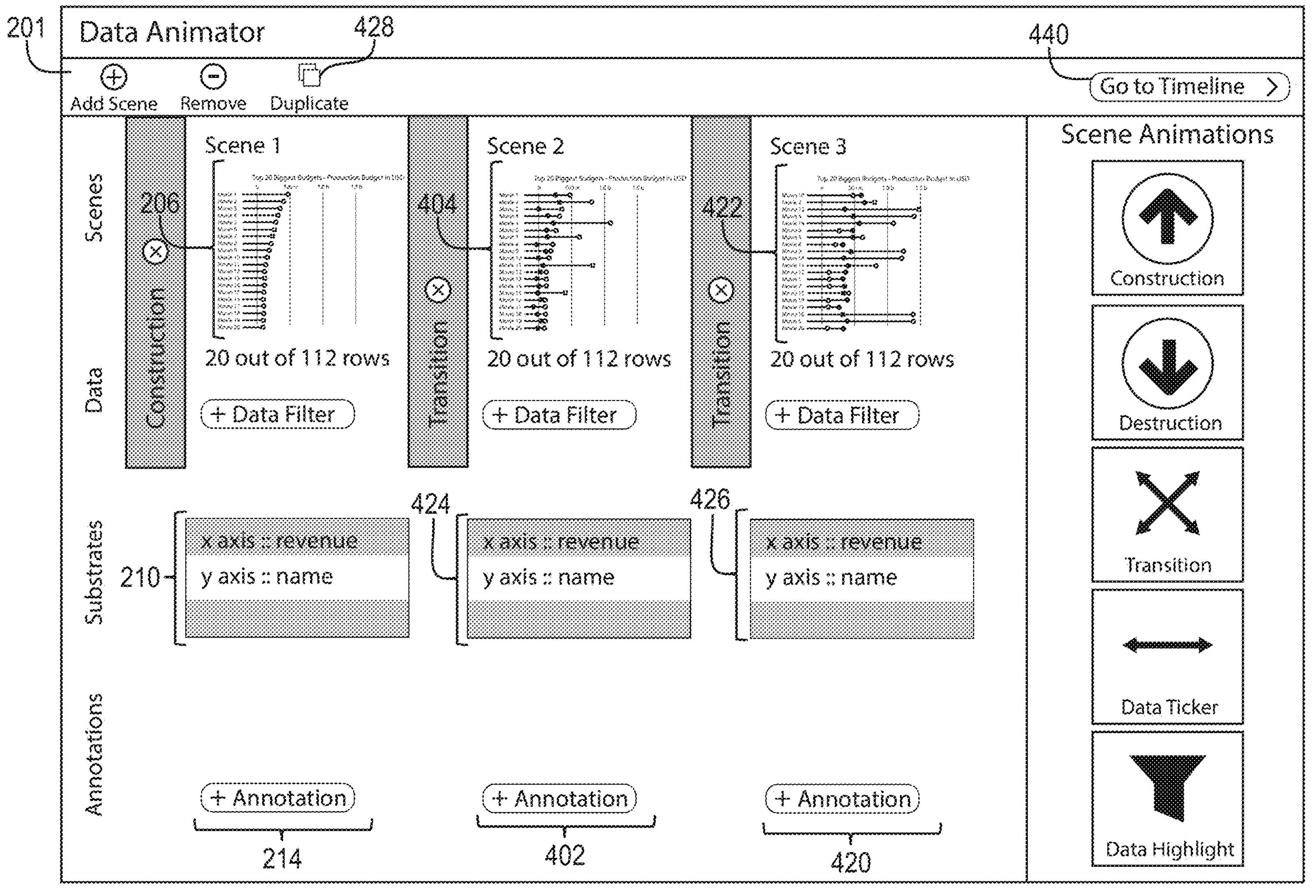

The digital narrative animation system can present multiple options for generating additional data graphics. For example, as illustrated in FIG. 4D, the storyboard animation interface 204 can include the add scene element 201 and a duplicate scene element 428. Additionally, FIG. 4D illustrates the storyboard animation interface 204 including the first scene 214, the second scene 402, and a third scene 420. The first scene 214 includes the first data graphic 206 and the first substrate element 210, the second scene 402 includes the second data graphic 404 and a second substrate element 424, and the third scene 420 includes a third data graphic 422 and a third substrate element 426.

The designer can interact with the add scene element 201 to add a new scene including a new data graphic. In particular, as illustrated in FIG. 4D, the designer uploads a new data graphic that differs from the second data graphic 404 of the second scene 402. The second data graphic 404 emphasizes different data from the dataset than does the first data graphic 206. In particular, the second data graphic 404 portrays an additional subset of data that is not portrayed by the first data graphic 206.

The digital narrative animation system can also generate a new data graphic by copying an existing data graphic and re-organizing data values. In particular, the designer can interact with the duplicate scene element 428 and select which scene to duplicate. In response to detecting interaction with the duplicate scene element 428 and the second scene 402, the digital narrative animation system copies the second scene 402 to generate the third scene 420. Based on user interaction with the third substrate element 426, the digital narrative animation system uses the corresponding dataset to reorganize values in the third data graphic 422.

Although not illustrated, the designer can also interact with the third substrate element 426 to modify data values displayed. For example, the designer can interact with the third substrate element 426 to change the values corresponding to the y-axis (e.g., display revenue along the x-axis by release date or some other data attribute rather than name).

The digital narrative animation system can also present, via a designer device, a preview of the animated data narrative. For example, as illustrated in FIG. 4D, the storyboard animation interface 204 includes a timeline view element 430. Based on interaction with the timeline view element 430, the digital narrative animation system generates and presents a timeline animation interface.

Figure 4E:
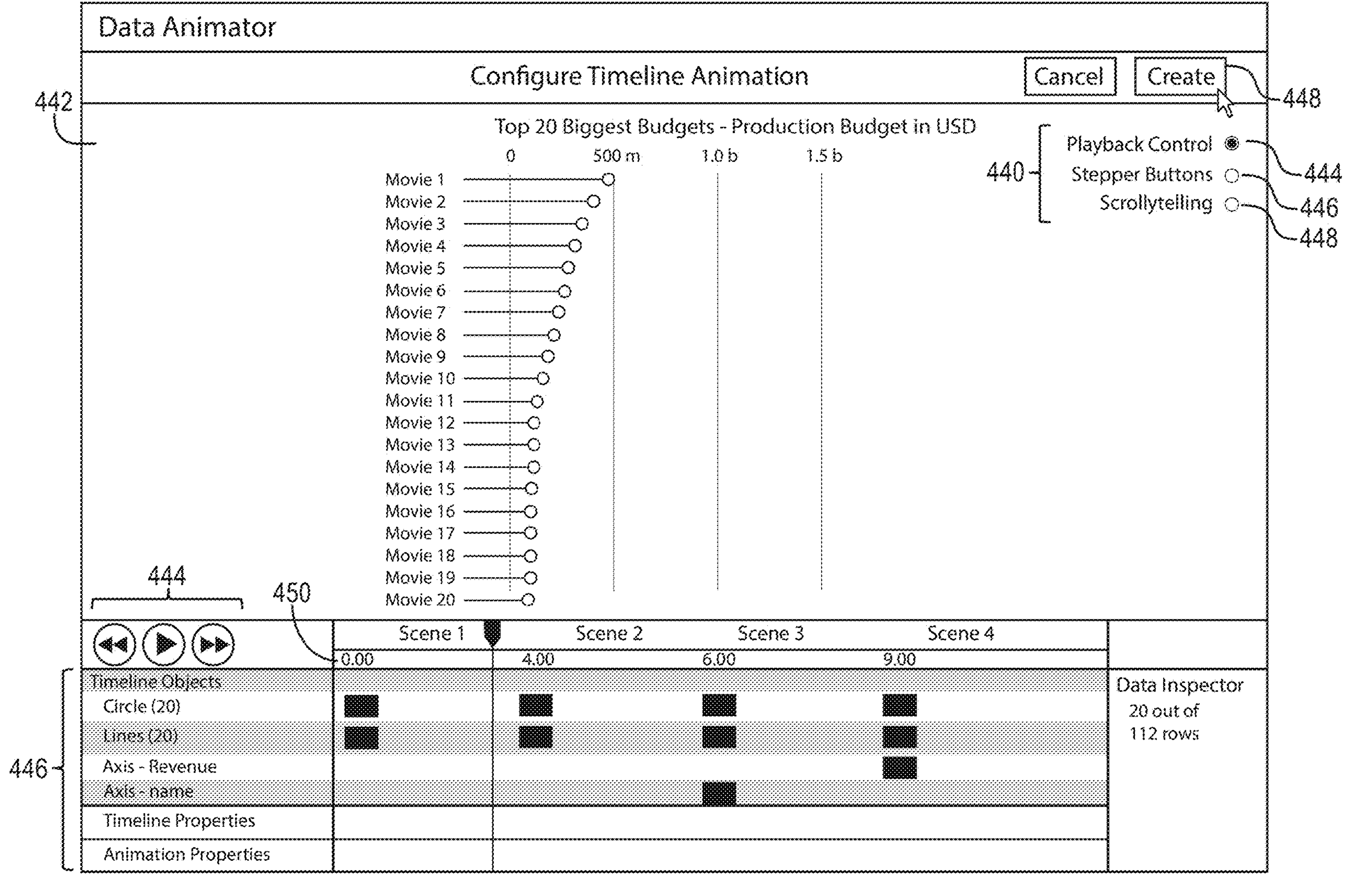

FIG. 4E illustrates an example timeline animation interface 432. The timeline animation interface 432 includes data narrative preview buttons 434, a property editor 436, and a create data narrative element 438.

Additionally, similar to the timeline objects element 224, the timeline properties element 226, and the animation timing element 230 discussed above with respect to FIG. 2B, the property editor 436 illustrated in FIG. 4E allows the designer to view and adjust the timing of animations for graphical data elements portraying various values. In particular, the property editor 436 includes selectable elements to modify transitions for timeline objects, timeline properties, and animation properties for all scenes in the data narrative. Each of the selectable elements is described in added detail with respect to FIGS. 2D-2E.

As further illustrated in FIG. 4E, the timeline animation interface 432 also includes client interactivity elements 440. In particular, the client interactivity elements 440 include a playback client interactivity element 444, a stepper button client interactivity element 446, and a scrollytelling client interactivity element 448. The digital narrative animation system uses the selected client interactivity element to generate (and/or export) a data narrative to a website with the selected interactivity mechanism. The interactivity mechanisms will be discussed in additional detail below with respect to FIG. 8. Though the client interaction selection element 440, as illustrated, is part of the timeline animation interface 432, the digital narrative animation system can present the client interactivity elements 440 as part of any interface. For example, the digital narrative animation system can present the client interactivity elements 440 as part of the storyboard animation interface 204, the transition animation interface 412, and/or the construction animation interface 220.

As illustrated in FIG. 4E, the designer has selected the playback client interactivity element 444. In response to the designer selection of the playback client interactivity element 444, the digital narrative animation system modifies the data narrative to reflect the selected interactivity element and presents a reference element to assist the designer in customizing the animated transitions. For example, based on the selection of the playback client interactivity element 444, the property editor 436 includes a time reference element 450. The time reference element 450 indicates the time frames (e.g., 0.00, 3.00, 6.00, etc.) for the animated transitions between scenes (e.g., during execution of a corresponding playback mechanism). The designer can customize the timing of transitions using the time frames as a reference.

Additionally, as illustrated in FIG. 4E, in response to the selection of the playback client interactivity element 444, the digital narrative animation system presents the data narrative preview buttons 434. In particular, based on interaction with the data narrative preview buttons 434, the digital narrative animation system presents a playback preview of the animated data narrative. The digital narrative animation system presents different preview options when the designer selects different client interactivity elements.

As further illustrated in FIG. 4E, the timeline animation interface 432 also includes the create data narrative element 438. By detecting selection of the create data narrative element 438, the digital narrative animation system generates an interactive animated data narrative. More specifically, the digital narrative animation system generates an animated data narrative for a website that includes a playback control (as described in greater detail in relation to FIG. 8.

Figure 4F:
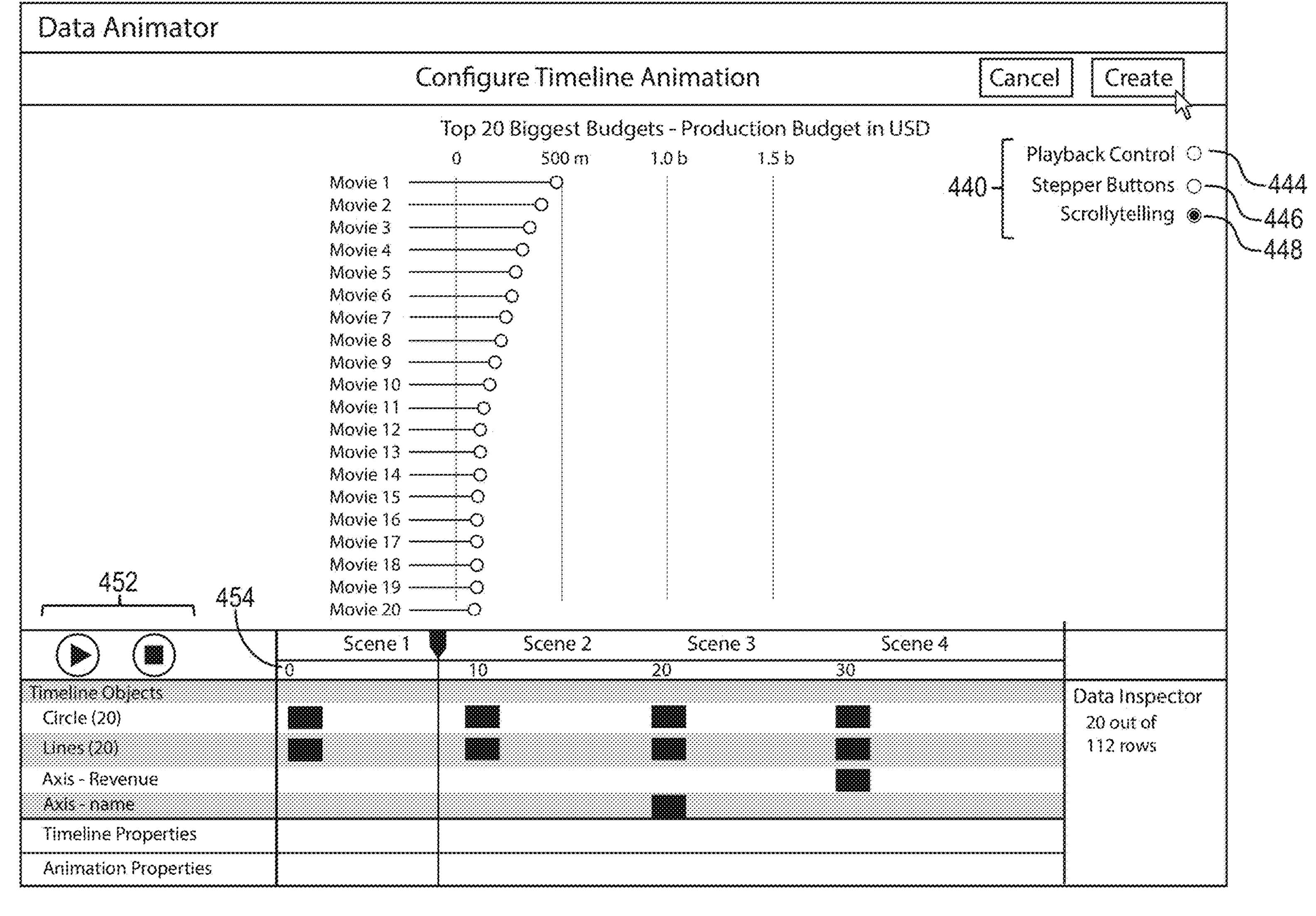

As described above, the designer can select a viewer interactivity mechanism using the client interaction selection element 440. FIG. 4F illustrates an example timeline animation interface 432 when the designer selects the scrollytelling client interactivity element 448. In general, FIG. 4F illustrates the client interaction selection element 440 including the playback client interactivity element 444, the stepper button client interactivity element 446, and the scrollytelling client interactivity element 448. Additionally, FIG. 4F illustrates scroll preview buttons 452 and a scroll reference element 454.

As illustrated in FIG. 4F, the designer has selected the scrollytelling client interactivity element 448. As will be described in additional detail below with respect to FIG. 8, in applying a scrollytelling mechanism, the data narrative progresses based on scroll events (i.e., detected scrolling from the viewer reaches a threshold). Based on the selection of the scrollytelling client interactivity element 448, the digital narrative animation system modifies the data narrative and corresponding transitions to reflect a scrollytelling mechanism (rather than a playback mechanism).

Indeed, in utilizing a scrollytelling mechanism, transitions are generally triggered and/or animated based on scroll events from a user. Utilizing a playback mechanism, transitions are generally triggered and/or animated based on time progression. Accordingly, in response to selection of the scrollytelling client interactivity element 448, the digital narrative animation system automatically modifies the data narrative and corresponding transitions. Specifically, the digital narrative animation system replaces time triggers with scrolling triggers in displaying scenes and transitioning between scenes.

The digital narrative animation system can transform a data narrative between time and scrolling triggers utilizing a variety of approaches. In one or more embodiments, the digital narrative animation system utilizes a transformation constant between time units and scrolling units. For example, the digital narrative animation system can utilize a transformation constant of 1 second to two scroll units. As used herein, a "scroll unit" refers to a measure of an amount of panning. In particular, a scroll unit can include an amount of panning input via a panning input device or a position of a panning element in a user interface. For example, a scroll unit can include a measure of an amount of scrolling input received from a mouse or a touch screen. Similarly a scroll unit can include a position of a scrolling element in a scroll bar in a user interface.

In other embodiments, rather than utilizing a transformation constant between time units and scrolling units, the digital narrative animation system utilizes pre-determined scrolling thresholds. Upon satisfying a scrolling threshold, the digital narrative animation system can trigger an animation. For example, the digital narrative animation system can utilize four scroll events for the duration of each scene (e.g., wait until five scrolling units have been detected before leaving a first scene) and two scroll events for a transition (e.g., two scroll events to animate a transition between scenes).

In some embodiments, the digital narrative animation system can utilize different approaches for different portions of a data narrative in transforming from a playback mechanism to a scrollytelling mechanism. For example, the digital narrative transformation system can utilize transformation constants for a first part of the data narrative (e.g., transitions or scene duration) and utilize a pre-determined scrolling threshold for a second part of the data narrative (e.g., transitions or scene durations).

Moreover, in some embodiments, the digital narrative animation system can utilize both scroll events and time in executing a scrollytelling mechanism. For example, the digital narrative animation system can apply a transformation constant for determining a threshold amount of scroll events to animate through a first scene. Upon reaching the threshold, the digital narrative animation system can apply a timed transition between two scenes (e.g., a 1 second transition). The digital narrative animation system can then utilize a transformation constant for determining a threshold amount of scroll events to animate through a second scene.

In relation to FIG. 4E, the digital narrative animation system transitions from time units to scroll units based on a transformation constant. In particular, the digital narrative animation system converts every four seconds of playback to ten scroll units. Moreover, the digital narrative animation system updates the timeline animation interface 432.

Specifically, the digital narrative animation system updates the timeline animation interface 432 to include the scroll preview buttons 452 and the scroll reference element 454. In particular, by interacting with the scroll preview buttons 452, the designer can preview how scroll events modify the data narrative across scenes and transitions. The designer can customize the animations with respect to scenes in the progression of the data narrative by referencing the scroll reference element 454. For example, the scroll reference element includes scroll events (e.g., 0, 10, 20, and 30) assigned to each portion of the data narrative. Thus, upon user interaction with scroll preview button, as a user scrolls the digital narrative animation system will animate a first transition, a first scene, a second transition, a second scene, and so forth.

Moreover, based on user interaction with the scroll reference element 454, the digital narrative animation system can modify the scroll events for particular scenes and/or transitions. For example, the digital narrative animation system can increase scroll events, decrease scroll events, or add a different triggering event in the data narrative. To illustrate, based on user input, the digital narrative animation system can reduce add a scroll triggering threshold. Once the user reaches the scroll triggering threshold, the digital narrative animation system can utilize a timed animation (e.g., a transition that lasts 1 second).

Although FIGS. 4E and 4F illustrate transforming a digital narrative from a playback control to a scrollytelling control, the digital narrative animation system can also transform a digital narrative from a scrollytelling control to a playback control. Indeed, the digital narrative animation system can utilize transformation constants and/or predetermined timing thresholds to transform from a scrollytelling control in a data narrative to a playback control in a data narrative (e.g., to transform from FIG. 4F to FIG. 4E).

Moreover, Although FIGS. 4E and 4F illustrate transforming a digital narrative from a playback control to a scrollytelling control, the digital narrative animation system can similarly modify a data narrative based on user interaction with the stepper button client interactivity element 446. In applying a stepper button control, a user can select particular scenes in viewing the data narrative. Accordingly, upon user interaction with the stepper button client interactivity element 446, the digital narrative animation system can transform a data narrative to include stepper points in the data narrative. For example, the digital narrative animation system can add a stepper point at the beginning and/or end of each scene (or beginning and/or end of each transition). Thus, a user can jump to the stepper points in the digital narrative.

It will be appreciated that a data narrative can include stepper points (e.g., a stepper control) and still include time and scroll mechanisms. For example, upon jumping to a stepper point, the digital narrative animation system can animate a timed transition to a scene. Similarly, upon jumping to a stepper point, the digital narrative animation system can utilize scroll events to animate a transition.

Because a user can jump between stepper points (in different parts of a data narrative), in one or more embodiments, the digital narrative animation system generates a plurality of transitions between a first scene and subsequent scenes. For example, the digital narrative animation system can generate transitions between a first scene and a third scene (in the event that the user jumps from the first scene to the third scene). Thus, in generating a data narrative upon selection of the stepper button client interactivity element 446, the digital narrative animation system can access underlying data and generate transitions between each scene in the data narrative. The digital narrative animation system can also provide, to the designer device, an option to view and customize each of the transitions between each of the scenes.

Figures 5A, 5B, 5C, 5D:
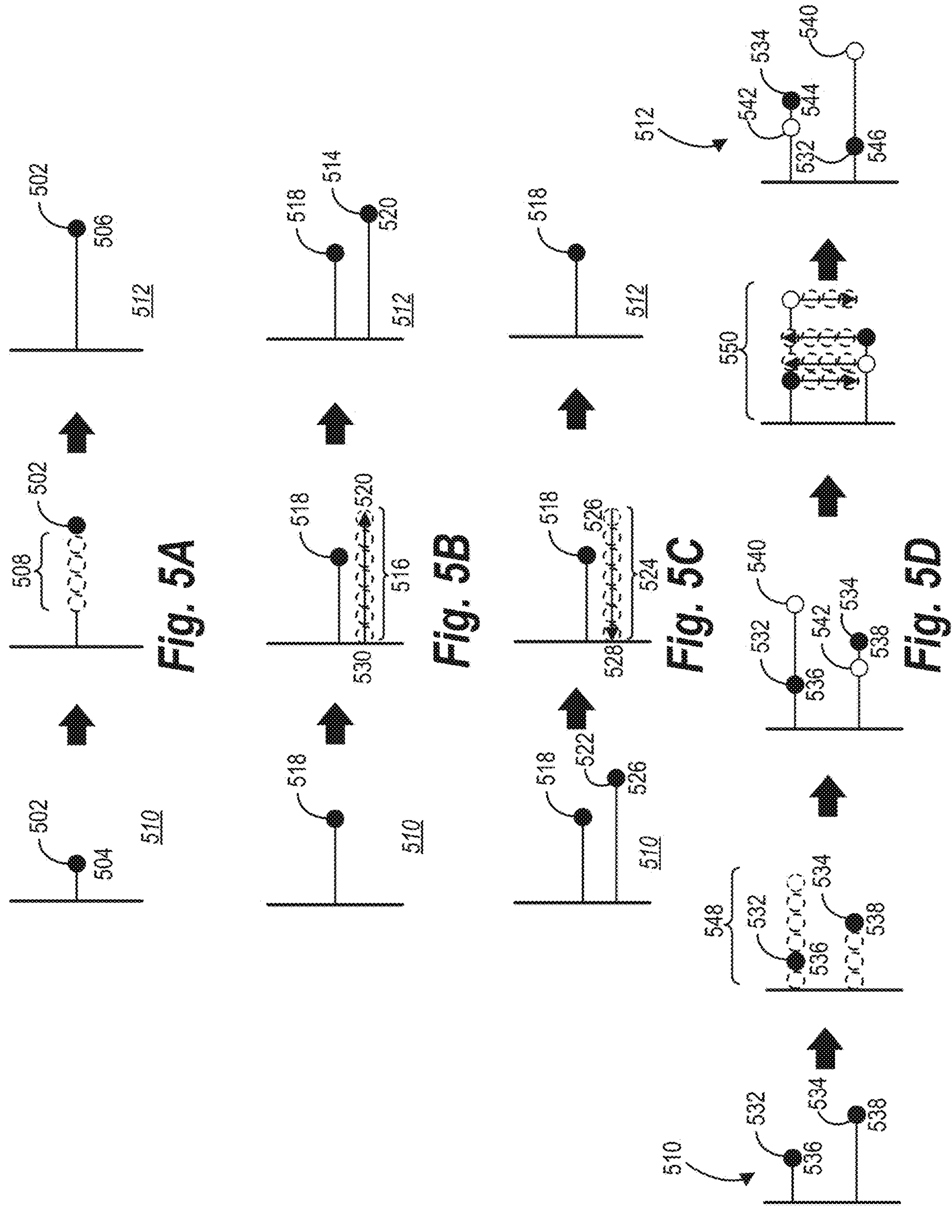
FIGS. 5A-5D illustrate generating intermediate graphical data elements for animations where data values update (e.g., move) between scenes, enter scenes, and exit scenes in accordance with one or more embodiments.

As discussed above, the digital narrative animation system animates data values that enter, exit, or interpolate between scenes of a data narrative. In particular, the digital narrative animation system constructs a plurality of intermediate graphical data elements as part of generating animations for graphical data elements in static data graphics. FIGS. 5A-5D illustrate how the digital narrative animation system generates intermediate graphical data elements to animate transitions in a data narrative. In particular, FIG. 5A illustrates example intermediate graphical data elements for a graphical data element that updates from a first position to a second position between scenes. FIG. 5B illustrates example intermediate graphical data elements for a graphical data element that enters between scenes. FIG. 5C illustrates example intermediate graphical data elements for a graphical data element that exits between scenes. FIG. 5D illustrates example intermediate graphical data elements for a graphical data element that both enters and updates between scenes. FIGS. 5A-5D illustrate animated transitions for data values between a first data graphic 510 in a first scene and a second data graphic 512 in a second scene. The first data graphic 510 and the second data graphic 512 can appear in any two scenes of a series of scenes in a data narrative. Additionally, though FIGS. 5A-5D illustrate animating graphical data elements in a lollipop chart, the digital narrative animation system can animate objects in any type of data graphic.

As mentioned above, FIG. 5A illustrates example intermediate graphical data elements generated by the digital narrative animation system for a graphical data element that moves between data graphics. For example, the digital narrative animation system determines that a graphical data element 502 is portrayed in a graphical data element in a first position 504 in the first data graphic of the first data graphic 510. Based on the corresponding dataset, the digital narrative animation system determines that the value portrayed by the graphical data element 502 is linked to the value portrayed by the graphical data element 502 at an updated position 506 in the second data graphic 512. The digital narrative animation system determines that the graphical data element 502 moves between the first position 504 to the updated position 506. The digital narrative animation system generates intermediate graphical data elements 508 for the graphical data element 502 from the first position 504 to the updated position 506 to simulate the movement of the graphical data element 502 between data graphics. As part of the animated transition between the first scene comprising the first data graphic 510 and the second scene comprising the second data graphic 512, the digital narrative animation system displays the intermediate graphical data elements 508 from the first position 504 to the updated position 506.

The graphical data element 502 illustrated in FIG. 5A can represent different values for one data case or the same value. For example, the value portrayed by the graphical data element 502 in the first position 504 can be a different value than the value portrayed by the graphical data element 502 in the updated position 506. In particular, the different values portrayed by the graphical data element 502 can be linked based on the determination that they are bound to the same data case. Additionally, the graphical data element 502 illustrated in FIG. 5A can represent the same value but in a sequence of data graphics that show different perspectives of the same data. In particular, the second data graphic 512 can use different axes than the first data graphic 510.

As mentioned above, the digital narrative animation system can animate the entrance of graphical data elements between data graphics. FIG. 5B illustrates intermediate graphical data elements generated by the digital narrative animation system to animate the entrance of a new graphical data element 514. In particular, FIG. 5B illustrates the first data graphic 510 including a graphical data element 518 and the second data graphic 512 including the graphical data element 518 (where the new graphical data element 514 is in a new position 520). FIG. 5B also illustrates intermediate graphical data elements 516 between the first data graphic 510 and the second data graphic 512.

As illustrated in FIG. 5B, the digital narrative animation system identifies that the new graphical data element 514 is introduced in the second data graphic 512. In particular, using the corresponding dataset, the digital narrative animation system determines that the data value portrayed by the graphical data element 518 in the first data graphic 510 corresponds with the data value portrayed by the graphical data element 518 in the second data graphic 512. Based on the dataset, the digital narrative animation system also determines that the second data graphic 512 includes the new graphical data element 514, which is not included in the first data graphic 510. Based on the determination that the graphical data element 514 is linked to data (e.g., a data case) that is not reflected in the first data graphic 510, the digital narrative animation system generates an animation for entering the first data graphic 510. Specifically, the digital narrative animation system generates intermediate graphical data element 516 from a starting point 530 to the new position 520 for the new graphical data element 514.

Although FIG. 5B illustrates generating an animated movement for the new graphical data element 514 from the starting point 530 to the new position 520, the digital narrative animation system can use other animation methods to introduce new data values between data graphics. In particular, the digital narrative animation system can animate the introduction of the new graphical data element 514 by increasing the opacity of the new graphical data element 514 at the new position 520. Thus, instead of generating the intermediate graphical data elements 516 that move from the starting point 530 to the new position 520, the digital narrative animation system can generate a series of intermediate graphical data elements at the new position 520, wherein each intermediate graphical data element is increasingly opaque. In at least some embodiments, the digital narrative animation system generates intermediate graphical data elements that follow a motion path between the starting point 530 and the new position 520 that also increase in opacity.

The digital narrative animation system can also animate the removal of a graphical data element between sequential data graphics. FIG. 5C illustrates the digital narrative animation system generating a series of intermediate graphical data elements to animate the removal of a graphical data element. In particular, FIG. 4C illustrates the first data graphic 510 portraying the graphical data element 518 and the removed graphical data element 522 at a former position 526. FIG. 4C also illustrates the second data graphic 512 the graphical data element 518 and a series of intermediate graphical data elements 524 between the former position 526 and an exit position 528.

As illustrated in FIG. 5C, the digital narrative animation system can identify data values to remove between data graphics. Based on the first data graphic 510, the second data graphic 512, and the determined links between the data graphics and the corresponding dataset, the digital narrative animation system determines that the graphical data element 522 is removed between the first data graphic 510 and the second data graphic 512. In particular, the digital narrative animation system can determine that the value portrayed by the graphical data element 518 in the first data graphic 510 corresponds with the value portrayed by the graphical data element 518 in the second data graphic 512 but there is no corresponding graphical data element in the second data graphic 512 for the graphical data element 522. Because the digital narrative animation system determines that the graphical data element 522 is removed between the data graphics, the digital narrative animation system animates the removal of the removed graphical data element 522.

In particular, and as illustrated in FIG. 5C, the digital narrative animation system generates the series of intermediate graphical data elements 524 between the former position 526 and the exit position 528. In additional embodiments, rather than varying the series of intermediate graphical data elements 524 by position, the digital narrative animation system can generate the series of intermediate graphical data elements 524 that are progressively less opaque. Thus, the animated transition comprises the removed graphical data element 522 fading out between the first data graphic 510 and the second data graphic 512. Additionally, the digital narrative animation system can combine the moving intermediate graphical data elements and the decreasing opacity intermediate graphical data elements to generate an animation in which the removed graphical data element 522 both moves to the exit position 528 and fades away.

As discussed above, the digital narrative animation system can generate a combination of intermediate graphical data elements to author an animation between a first data graphic and a second data graphic. FIG. 5D illustrates the first data graphic 510 portraying a graphical data element 532 in a first position 536 and a second graphical data element 534 in an original position 538. FIG. 5D also illustrates the second data graphic 512 portraying the graphical data element 532 in an updated position 546 and the second graphical data element 534 in a second position 544. The second data graphic 512 also illustrates an additional graphical data element 540 and a second additional graphical data element 542.

As illustrated in FIG. 5D, the digital narrative animation system animates entry of the additional graphical data element 540 and the second graphical data element 542. In particular, the digital narrative animation system generates the intermediate graphical data elements 548 that introduce the additional graphical data element 540 and the second additional graphical data element 542 to the data graphic.

As further illustrated in FIG. 5D, the digital narrative animation system animates the transition of data values between the first data graphic 510 and the second data graphic 512. Based on the links between the first data graphic 510 and the corresponding dataset and the second data graphic 512 and the corresponding dataset, the digital narrative animation system identifies graphical data elements that interpolate between consecutive scenes. For example, the digital narrative animation system determines that the graphical data element 532 moves from the first position 536 to the updated position 546 of the second data graphic 512. Additionally, the digital narrative animation system determines that the second graphical data element 534 moves from the original position 538 in the first data graphic 510 to the second position 544 in the second data graphic 512. Thus, the digital narrative animation system generates a series of intermediate graphical data elements 550 as part of animating the movement of the data values between data graphics.

Although FIG. 5D illustrates the digital narrative animation system first animating the introduction of the additional graphical data element 540 and the second additional graphical data element 542 before animating the movement of the data values, the digital narrative animation system can perform these steps simultaneously. Alternatively, the digital narrative animation system can move the data values before generating the additional data values.

Figure 6:
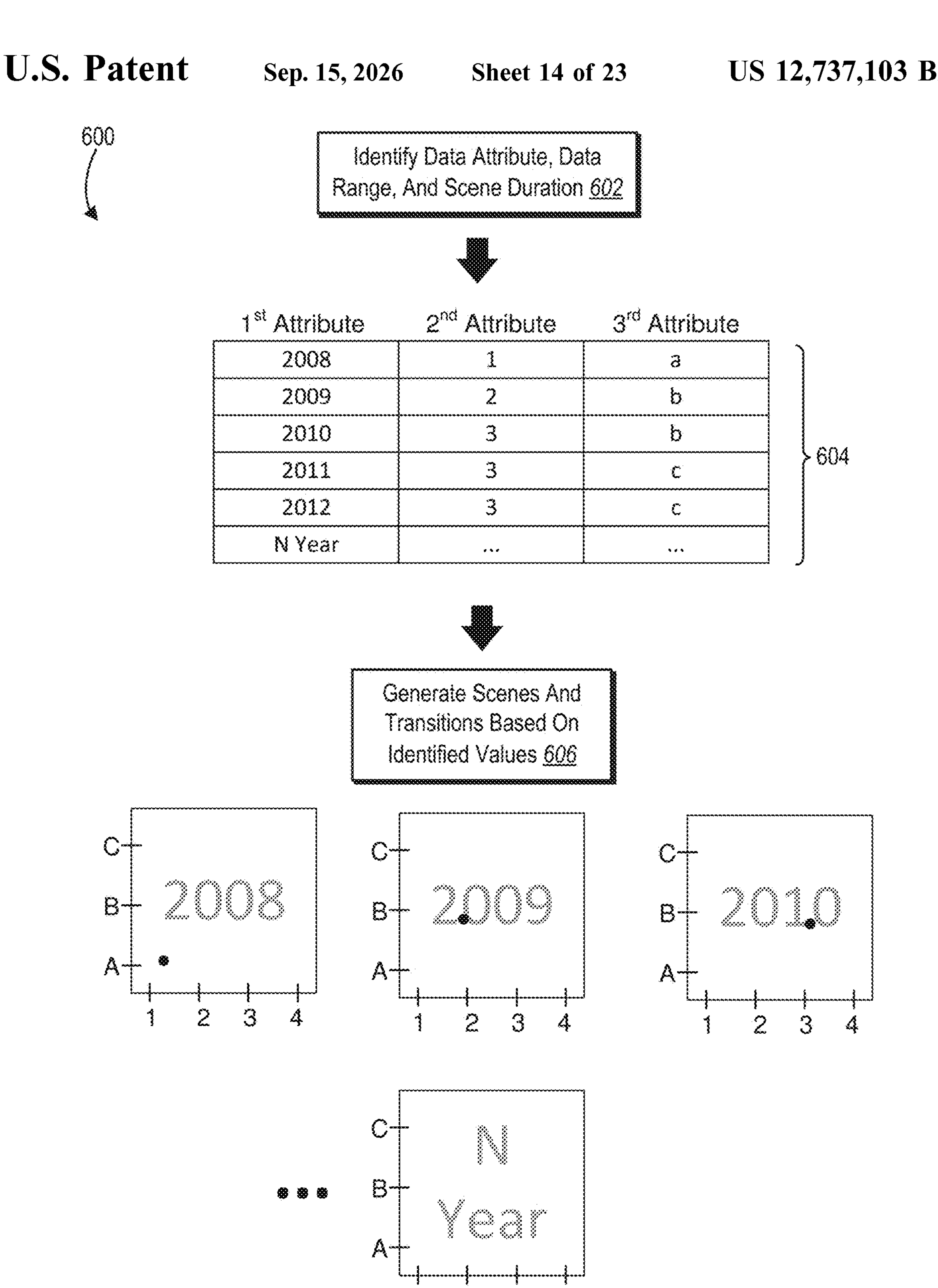
FIG. 6 illustrates a schematic diagram of using an identified data attribute and an identified scene duration to automatically generate scenes in an animated data narrative in accordance with one or more embodiments.

As discussed above, the digital narrative animation system can use an identified data attribute and an identified scene duration to automatically generate data-driven animations from a static data graphic (e.g., a template data graphic). FIG. 6 provides an overview of utilizing the digital narrative animation system to generate an animated data narrative from a template data graphic and corresponding dataset. In particular, FIG. 6 illustrates a series of acts 600 performed by the digital narrative animation system. As shown, the digital narrative animation system performs an act 602 of identifying the data attribute, the data range, and the scene duration. In particular, the digital narrative animation system receives, from the designer, a selection of the data attribute and the scene duration. For example, and as illustrated in FIG. 6, the designer selects the first attribute (i.e., year) as the data attribute. The designer also chooses the length of time each scene will be displayed.

As part of the act 602, the digital narrative animation system identifies the data range. The digital narrative animation system identifies the data range by determining a first value in a dataset (e.g., a data attribute) and a last value in a dataset to be included in the data narrative. The digital narrative animation system identifies the first value of the identified data attribute in the dataset that corresponds to the first data graphic of the first scene. In particular, the digital narrative animation system determines a link between the first scene uploaded by the designer and the corresponding dataset. Based on the link, the digital narrative animation system identifies the first value of the identified attribute. For example, as illustrated, the designer adds a first scene that portrays data for the year 2008. Based on the designer's selection of the first data attribute "year" as the data attribute, the digital narrative animation system identifies that the first value for the identified attribute "year" is 2008.

As part of determining the data range in the act 602, the digital narrative animation system identifies the last value in the dataset that corresponds to the last data graphic scene in the data narrative. In at least one embodiment, the digital narrative animation system automatically identifies, as the last value in the data range, the last possible value for the identified attribute in the dataset. In particular, the digital narrative animation system can identify the last data attribute in the dataset for the identified data attribute. For example, as illustrated in FIG. 6, for the identified data attribute (i.e., "year"), the digital narrative animation system determines that the last identified data attribute in the dataset is "N year." In at least one other embodiment, the digital narrative animation system receives, from the designer, a selection of a value for the last data attribute. For example, the designer can select a range of data attributes (e.g., 2008-2018) to be included in the data narrative.

As shown in FIG. 6, the series of acts 600 includes an act 604 of identifying scene values in the dataset. The digital narrative animation system accesses the corresponding dataset and identifies scene values that correspond to the data range. More specifically, the digital narrative animation system identifies data corresponding to scene values for the identified attribute in the dataset from the first value to the last value in the data range. For example, the digital narrative animation system identifies values for the second and third attributes that correspond to the identified year attribute. More particularly, for the year 2008, the digital narrative animation system identifies the values "1" and "a." For the subsequent year 2009, the digital narrative animation system identifies the values "2" and "b." The digital narrative system identifies values corresponding to each sequential identified attribute from the first value to the last value in the data range. The digital narrative animation system can utilize these scene values to automatically generate scenes and transitions.

Indeed, as shown in FIG. 6, the digital narrative animation system performs the act 606 of generating scenes and transitions based on the identified values. In particular, the digital narrative animation system generates data graphics for each scene based on each sequential value of the identified data attribute. For example, as illustrated, the digital narrative animation system generates data graphics for each year (i.e., identified attribute) in the data range. As illustrated in FIG. 6, the digital narrative animation system uses the year (identified attribute) and the identified values for the second attribute and the third attribute to generate the series of data graphics. For example, the digital narrative animation system generates a scene with a data graphic for the year 2008 portraying the second and third attribute values "1" and "a." Similarly, the digital narrative animation system generates a scene with a data graphic for the year 2009 portraying values "2" and "b." The digital narrative animation system generates the series of scenes and data graphics from the first value in the data range to the last value in the data range.

The digital narrative animation system compiles the generated scenes and animates transitions between each generated scene to generate the data narrative. In particular, the digital narrative animation system generates intermediate graphical data elements between corresponding graphical data elements in each generated data graphic as described above with respect to FIGS. 3 and 5A. As illustrated in FIG. 6, the digital narrative animation system determines that the graphical data element in the 2008 data graphic and the graphical data element in the 2009 data graphic reflect corresponding data cases. Thus, the digital narrative animation system generates intermediate graphical date elements between the graphical data element in the 2008 data graphic and the data element in the 2009 data graphic. The digital narrative animation system repeats this process for each sequential pair of data graphics to generate animations for the data narrative.

As discussed above, the digital narrative animation system can automatically generate a sequence of scenes portraying data graphics based on a selected data attribute. For example, FIGS. 7A-7D illustrate a series of graphical user interfaces for automatically generating a data narrative based on a template data graphic and a selected data attribute in accordance with one or more embodiments.

Figure 7A:
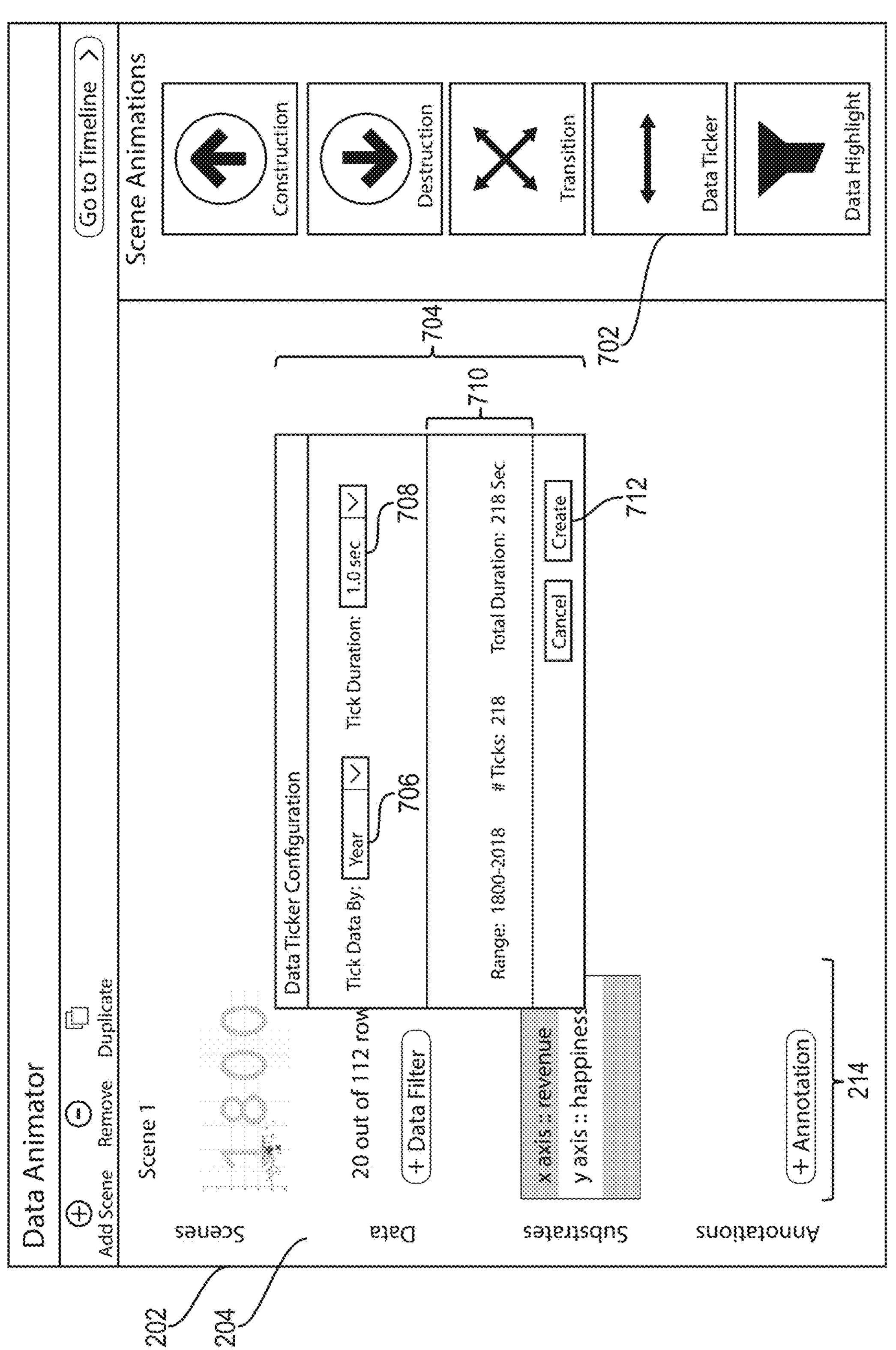
FIGS. 7A-7D illustrate a one or more graphical user interfaces that include automatically generated scenes in accordance with one or more embodiments.

As illustrated in FIG. 7A, the digital narrative animation system presents the storyboard animation interface 204 on the display screen 202 of the designer device. The storyboard animation interface 204 includes the first scene 214, indicating that the digital narrative animation system has imported a static (template) data graphic and the corresponding dataset. Additionally, the storyboard animation interface 204 includes a data ticker element 702. When the digital narrative animation system detects interaction with the data ticker element 702, the digital narrative animation system updates the storyboard animation interface 204 to display a data ticker configuration window 704. Designers can interact with the data ticker element 702 by selecting the data ticker element 702 or by dragging the data ticker element 702 to the first scene 214. The data ticker configuration window 704 includes a data attribute selection element 706, a scene duration selection element 708, data narrative information 710, and an interactive create narrative element 712.

Based on user interaction with the data ticker configuration window 704 of FIG. 7A, the digital narrative animation system automatically generates scenes within the data narrative. In particular, the designer selects a data attribute using the data attribute selection element 706. The digital narrative animation system generates the data graphics of the data attribute using the selected data attribute as an independent variable that varies across scenes. For example, because the designer selected the data attribute "year" on the data attribute selection element, the digital narrative animation system generates scenes portraying values for the other data attributes for each year starting with the year portrayed in the first scene (as described above with respect to FIG. 6). As illustrated, the digital narrative animation system generates a series of data graphics depicting values corresponding with year starting with the year portrayed in the first scene 214 (e.g., "1800").

The designer also interacts with the scene duration selection element 708 to customize the length of time that the data narrative will display each scene in the data narrative. For example, as illustrated in FIG. 7A, the designer selects "1.0 sec" using the scene duration selection element 708. Thus, the digital narrative animation system presents the automatically-generated scenes of the data narrative for the amount of time indicated by the scene duration selection element 708.

The data ticker configuration window 704 of FIG. 7A also includes the data narrative information 710. The data narrative information 710 includes information about the automatically-generated data narrative. In particular, the data narrative information 710 includes information such as the range of attributes to be included in the data narrative, the number of scenes (or "ticks") in the data narrative, and the total duration of the data narrative. The data narrative information 710 shows information that reflects the designer's interactions with the data attribute selection element 706 and the scene duration selection element 708. For example, the "total duration" of the data narrative updates in real time based on the designer's selection using the scene duration selection element 708. More specifically, the total duration equals the selected scene duration multiplied by the number of scenes. Additionally, the range of the automatically generated data narrative includes the first scene 214 to the last scene based on the selected data attribute using the data attribute selection element 706. For example, the illustrated range is 1800-2018 reflecting that the year for the first scene 214 is 1800 and the last year in the dataset is 2018.

Figure 7B:
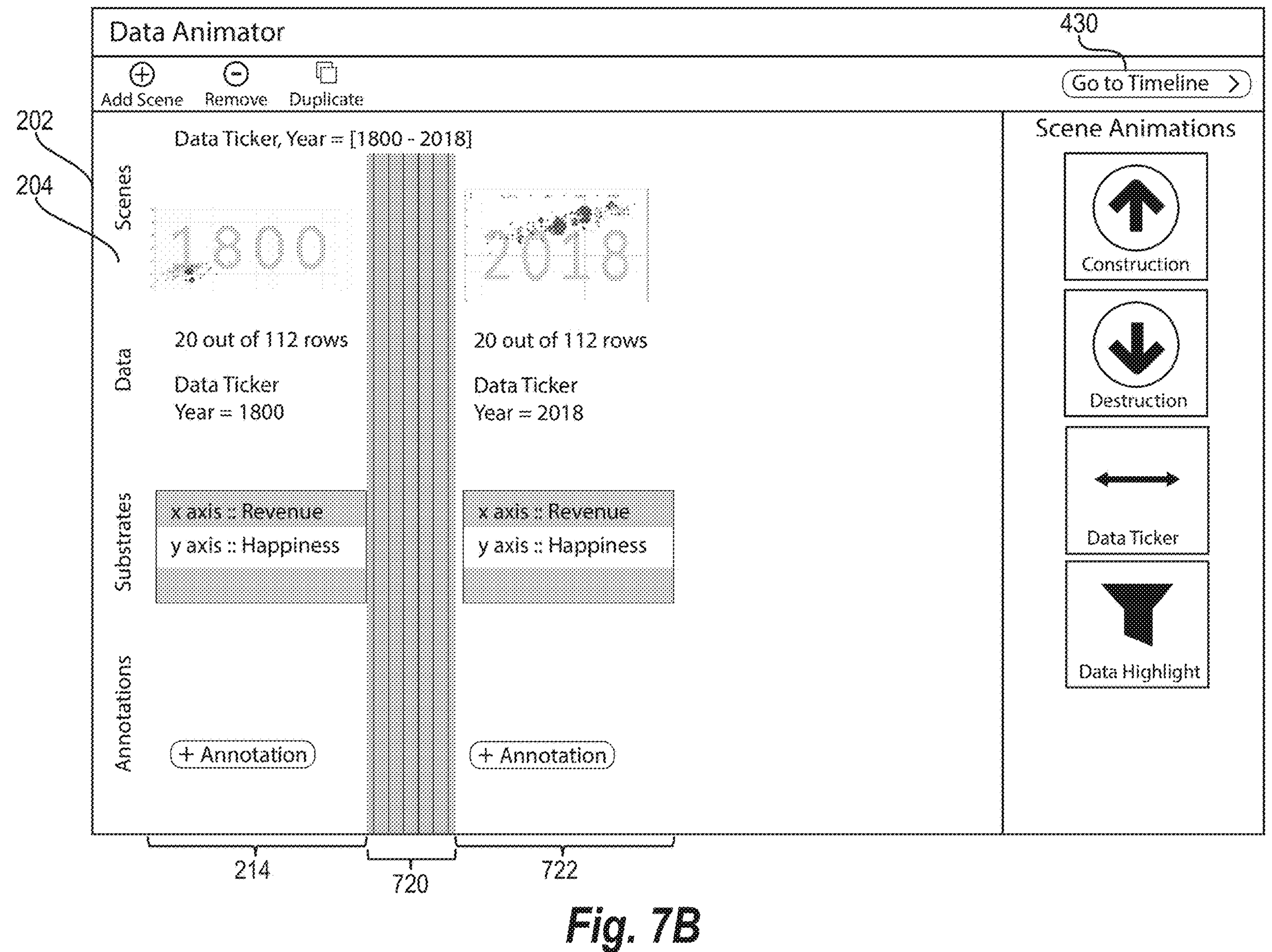

Based on detecting user interaction with the interactive create narrative element 712 of the data ticker configuration window 704, the digital narrative animation system generates the scenes for the data narrative. As illustrated in FIG. 7B, the digital narrative animation system updates the storyboard animation interface 204 to display the first scene 214, a stack of transitional scenes 720, and a last scene 722. The storyboard animation interface 204 also includes the timeline view element 430.

The stack of transitional scenes 720 illustrated in FIG. 7B represents the series of generated scenes and transitions automatically generated by the digital narrative animation system. As described in additional detail above with respect to FIG. 6, the digital narrative animation system generates scenes and transitions based on the identified data attribute and corresponding values. The stack of transitional scenes 720 represents the series of scenes including the generated data graphics generated by the digital narrative animation system. As illustrated, the stack of transitional scenes 720 includes scenes that contain data graphics portraying values for each year in the dataset from the year 1800 to the year 2018.

The digital narrative animation system can expand the stack of transitional scenes 720 of FIG. 7B. In particular, based on detecting interaction with the stack of transitional scenes 720, the digital narrative animation system displays each of the individual transitional scenes between the first scene 214 and the last scene 722. The designer can, after expanding the stack of transitional scenes 720, customize individual scenes. For example, the designer can customize annotations associated with a particular data graphic by selecting the corresponding scene. As illustrated, the designer can select the stack of transitional scenes 720 to view the scenes portraying data for each year in the dataset from 1800 to 2018.

Figure 7C:
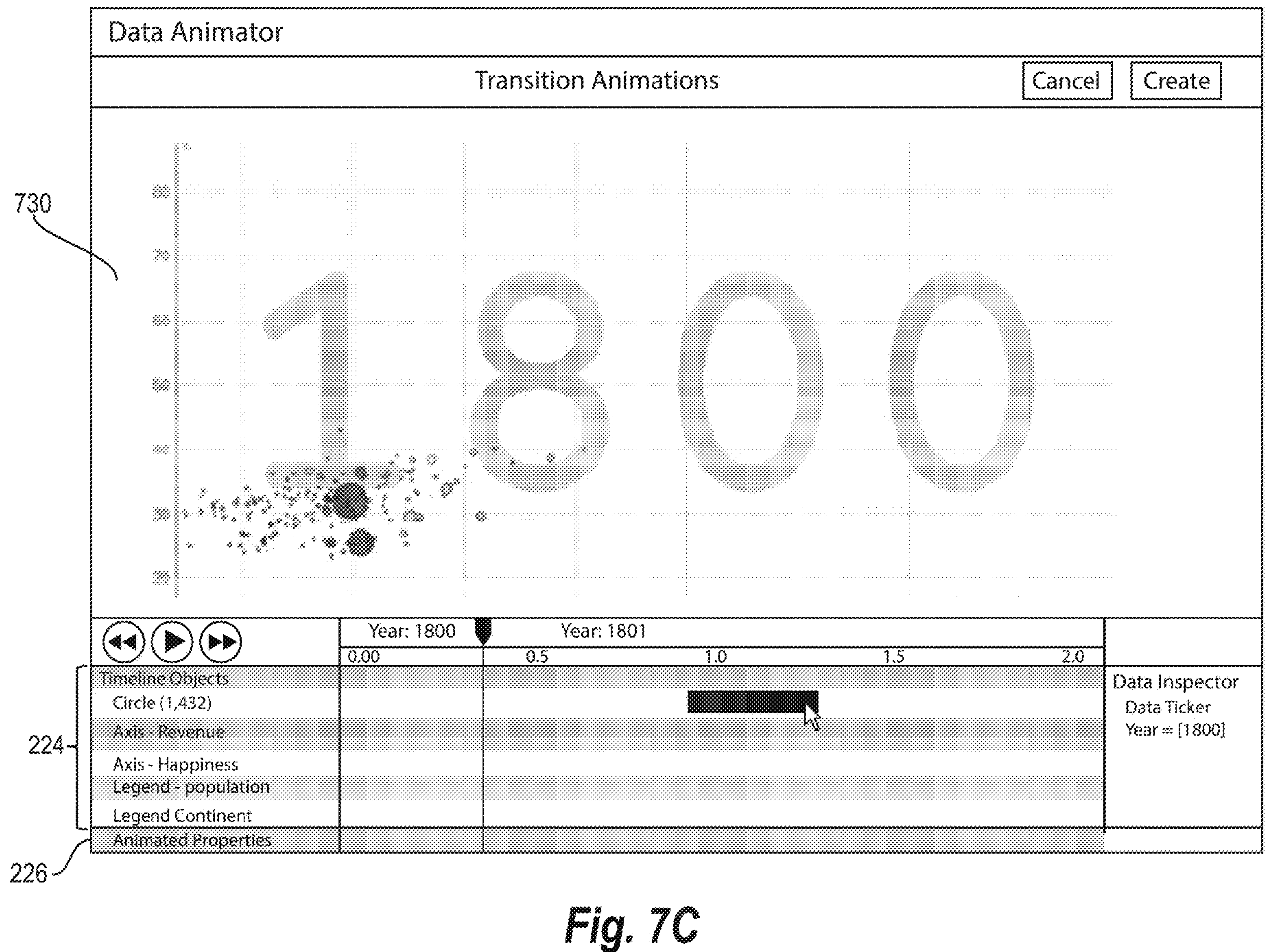

The designer can select the timeline view element 430 to view a template animations interface that enables the designer to customize the animated transition between all scenes from the first scene 214 to the last scene 722. FIG. 7C illustrates an example template animations interface 730. The template animations interface 730 includes the timeline objects element 224 and the selectable timeline properties element 226.

The designer can specify when data values are animated using the timeline objects element 224. As illustrated in FIG. 7C, the timeline objects element 224 indicates that the circle data values are animated at the one second mark in the transition between the first scene 214 ("Year: 1800") and the second scene ("Year: 1801"). The designer can select and drag the bar in the timeline objects element 224 to further customize the animation of the circle data values. More specifically, the designer can expand the bar to slow down the animation or move it to a different timeframe. The designer can interact with the timeline objects element 224 to order and modify animations of graphical data elements in the data graphic. The designer interacts with the timeline properties element 226 to specify the types of animations for the graphical data elements.

Figure 7D:
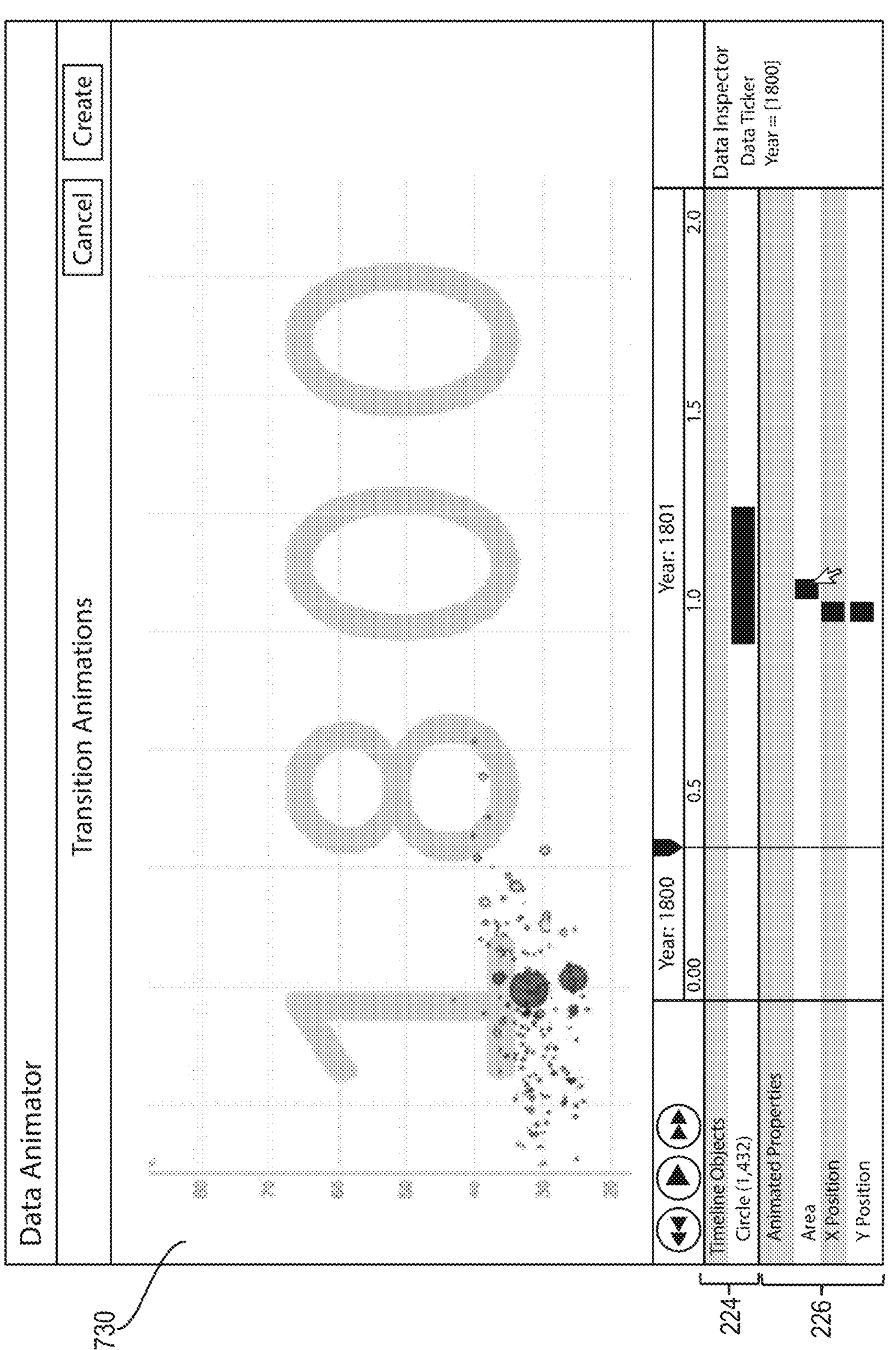

As discussed above, the designer can customize the animated properties by interacting with the animated properties element. As illustrated in FIG. 7D, based on user interaction with the timeline properties element 226, the digital narrative animation system expands the timeline properties element 226 to provide the designer with additional customization options. In particular, the digital narrative animation system can select the type of animation and customize the timing of specific animated properties. For example, the designer can select "Area" as an animated property to re-size graphical data elements between scenes. Additionally, the designer can identify movement as an animated property by specifying movement based on the "x position" and the "y position." In at least one embodiment, the designer can select various animated properties including, but not limited to, opacity, color, visibility, size, and position.

The designer can also order the selected animated properties by interacting with the timeline properties element 226. In at least one embodiment, the designer orders animated properties by dragging and adjusting the length of bars in the timeline properties element 226. As illustrated, the "x position" and the "y position" properties are animated before the "area" property. Thus, in the animation between scenes, the digital narrative animation system will first move the data value along the x and y axes before animating a change in area (expanding or diminishing) the graphical data element. The designer can interact with the bars in the timeline properties element 226 to further customize the order of animated properties.

In this manner, the digital narrative animation system can automatically and efficiently generate a data narrative that reflects modifications in data. Indeed, in relation to FIGS. 7A-7D, the digital narrative animation system generates a digital narrative with more than 2,000 scenes and transitions that dynamically illustrate changes in position and size of graphical data elements that reflect values changes in the underlying data. The digital narrative animation system does so with a few clicks from a designer.

Figure 8:
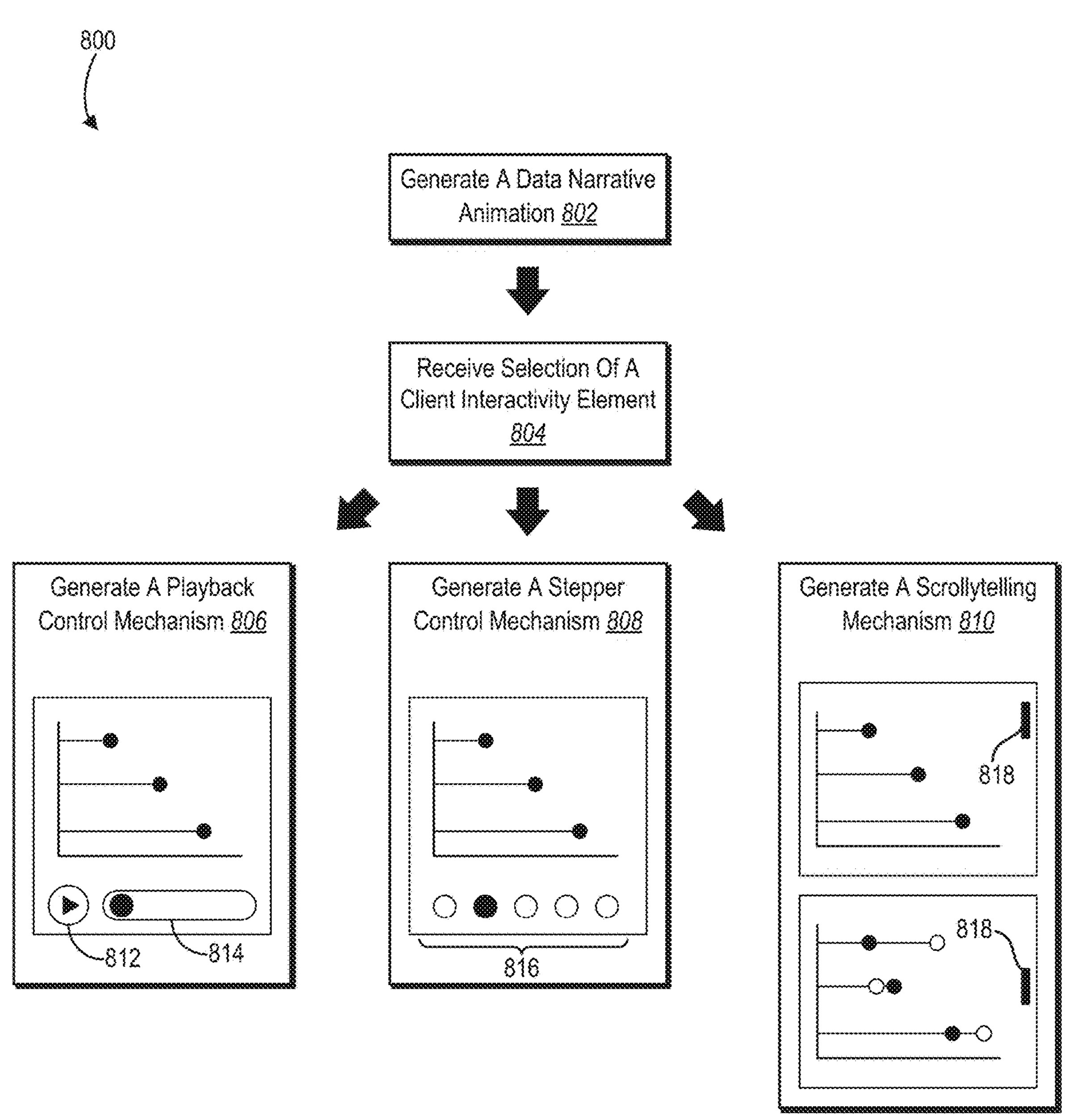
FIG. 8 illustrates a schematic diagram of selecting client interactivity elements and exporting a data narrative with different control mechanisms in accordance with one or more embodiments.

As discussed previously, the digital narrative animation system can export data narratives as interactive websites. In particular, the interactive websites can include three types of client control mechanisms. FIG. 8 provides an overview of the digital narrative animation system generating an interactive website that implements a client control mechanism. FIG. 8 illustrates a series of acts 800 performed by the digital narrative animation system. As shown, the digital narrative animation system performs an act 802 of generating a data narrative animation. As described above, the digital narrative animation system generates a data narrative animation by compiling scenes and generating data-driven animations between those scenes.

As shown in FIG. 8, the digital narrative animation system also performs an act 804 of receiving a selection of a client interactivity element. As discussed above with respect to FIG. 4F, the digital narrative animation system presents, via the designer device, a client interaction selection element. Based on the designer's selection of the playback client interactivity element, the stepper button client interactivity element, or the scrollytelling client interactivity element, the digital narrative animation system exports the animated data narrative with the corresponding client interactivity mechanism.

As further illustrated in FIG. 8, the digital narrative animation system performs an act 806 of generating a playback control mechanism. As illustrated, the playback control mechanism includes an interactive play button 812 and an interactive scrubber bar 814 within a website. The client views the animated data narrative by selecting the interactive play button 812. Additionally, the client can control the displayed frames of the animated data narrative by interacting with the interactive scrubber bar 814. For example, the client can drag the playhead along the interactive scrubber bar to view specific frames of the animated data narrative. Though not illustrated, the digital narrative animation system can also provide rewind and fastforward buttons. Additionally, the digital narrative animation system can provide, to the client, options to change the pacing of the animated data narrative (e.g., 2× speed, 4× speed, etc.). The client can play, pause, or scrub along the timeline of the entire data narrative.

In addition, as shown in FIG. 8, the digital narrative animation system performs an act 808 of generating a stepper control mechanism. As shown, the digital narrative animation system generates and provides a website with stepper buttons 816. The stepper buttons 816 are a sequential list of buttons that allow the client to select next or previous stepper points (e.g., scenes) in a data narrative or jump forward or backward. More specifically, the digital narrative animation system associates stepper points of the data narrative (described above in relation to FIG. 4F) with each stepper button of the stepper buttons 816. The digital narrative animation system presents appropriate animations between each combination of scene sequences. More specifically, the digital narrative animation system prepares animated transitions between each scene in the data narrative (i.e., even if the scenes are not consecutive).

In step 810 of series of acts 800, the digital narrative animation system generates a scrollytelling mechanism. The scrollytelling mechanism allows clients to control the playback of the data narrative using the scroll event on the web page. Using the scrollytelling mechanism, the digital narrative animation system uses a threshold scroll event as a trigger to transition between scenes. The digital narrative animation system can create interactive animated data narratives that respond to horizontal scrolling or vertical scrolling. In one or more embodiments, the digital narrative animation system associates scenes of the data narrative with locations of a scroll bar 818 on the web page. For example, as illustrated in FIG. 8, the digital narrative animation system associates the first scene with the scroll bar 818 in a first location. The digital narrative animation system associates the second scene with the scroll bar 818 in a second location. Accordingly, the client controls the pace of the data narrative using the scroll event on the web page.

Although FIG. 8 illustrates websites having only a single interactivity mechanism, as described above, the digital narrative animation system can generate a website having one or more interactivity mechanisms. For example, as described above (e.g., in relation to FIG. 4F), the digital narrative animation system can generate a website that includes a stepper mechanism with playback and/or scrollytelling mechanisms.

Thus, a user at a client device can access a website and control presentation of the data narrative. Moreover, because the data narrative reflects underlying data, in one or more embodiments, the client devices can access varying data narratives that vary with the underlying data. For example, if the data narrative animation system receives modified or updated data, it can adjust scenes and transitions based on the underlying data and present a modified data narrative via the website. Thus, the data narrative animation system can present a dynamic updating dashboard narrative via a website.

Figure 9:
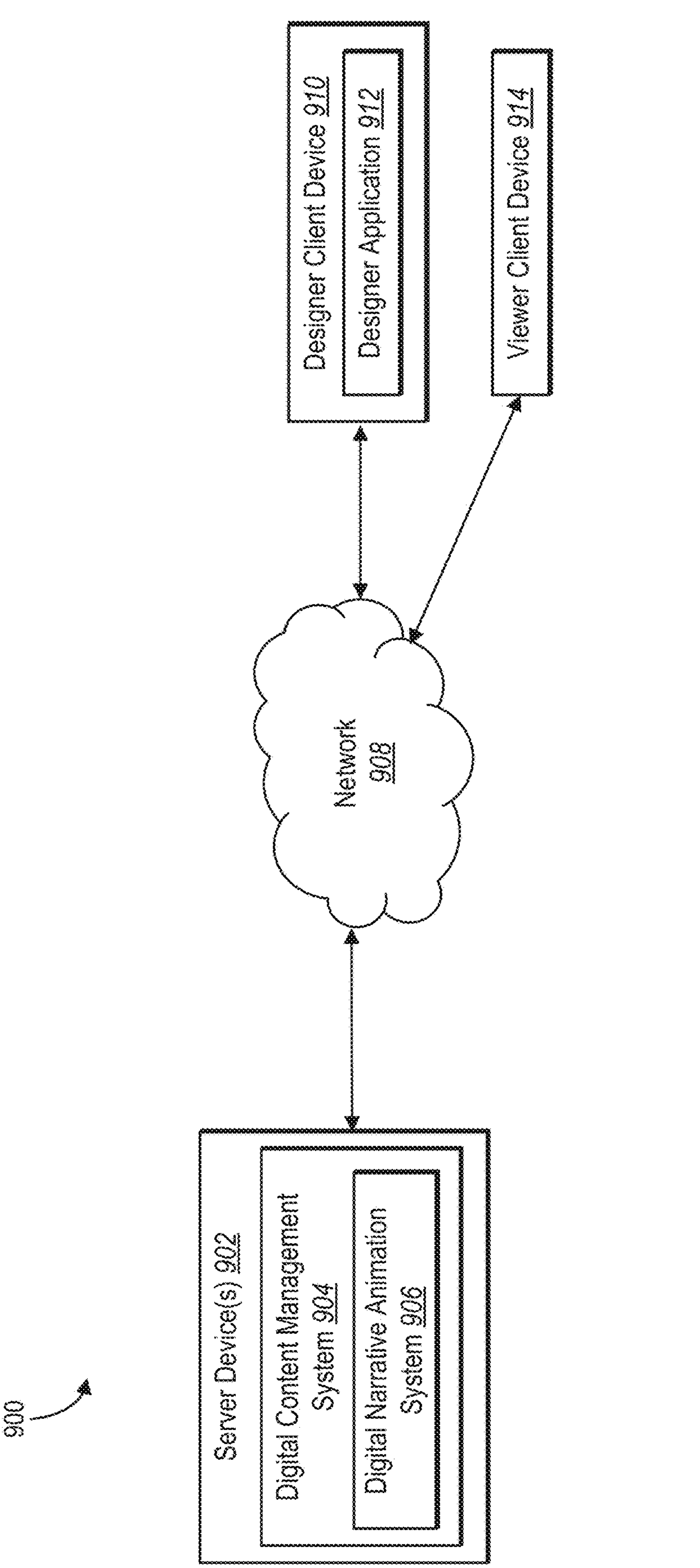
FIG. 9 illustrates a block diagram of an environment in which a digital narrative animation system can operate in accordance with one or more embodiments.

FIG. 9 illustrates a schematic diagram of an environment 900 in which the digital narrative animation system 906 may be implemented in accordance with one or more embodiments. As shown in FIG. 9, the environment 900 includes various computing devices including server device(s) 902, a designer device 910, and a client device 914 associated with a client. In addition, the environment 900 includes a network 908. The network 908 may be any suitable network over which the computing devices can communicate. Example networks are discussed in more detail below with regard to FIG. 12.

As shown, the environment 900 includes the designer device 910 and the client device 914. The designer device 910 and the client device 914 may comprise various types of client devices. For example, in some embodiments, designer device 910 and the client device 914 include a mobile device, such as a laptop, a tablet, a mobile telephone, a smartphone, etc. In other embodiments, the designer device 910 and the client device 914 include a non-mobile device, such as a desktop or server, or any other type of client device. Additional details with regard to the designer device 910 and the client device 914 are discussed below with respect to FIG. 12.

As illustrated in FIG. 9, the environment 900 includes the server device(s) 902. The server device(s) 902 can generate, store, receive, and/or transmit any type of data, including static data graphics and animated data narratives. For example, the server device(s) 902 can receive, store, and modify a static data graphic and a corresponding dataset from the designer device 910 and transmit interactive animated data narratives to the client device 914. In one or more embodiments, the server device(s) 902 comprises a data server. The server device(s) 902 can also comprise a communication server or a web-hosting server. Additional detail regarding the server device(s) 902 are provided below in relation to FIG. 12.

As shown, the server device(s) 902 includes the digital narrative animation system 906, and the digital content management system 904. The digital content management system 904, facilitates creating, modifying, editing, sharing, distributing and/or managing of digital content, including websites or other interactive digital content. For example, the digital content management system 904 can store a repository of digital content, including digital images, digital videos, data graphics, and data narratives (e.g., digital content received from the designer device 910) and provide the digital content to the client device 914.

As shown, the digital content management system 904 can include the digital narrative animation system 906. For example, as described above, the digital narrative animation system 906 can generate an interactive data narrative with data-driven animations by creating data-driven animations between scenes containing static data graphics. Moreover, the digital narrative animation system 906 (via the digital content management system 904) can provide the interactive data narrative to the designer device 910 (e.g., for design and review) and the client device 914 (e.g., for presenting and viewing the data narrative). For example, the digital narrative animation system 906 can record an animation reflecting a digital narrative (e.g., a digital video) and provide it via the website. The digital narrative animation system 906 can also generate a narrative animation with scenes and transitions in real-time as a client device interacts with a website (e.g., access datasets in real-time to generate transitions without recording/replaying an animation).

As illustrated, in one or more embodiments, the server device(s) 902 can implement all, or a portion of, the digital narrative animation system 906. In particular, the digital narrative animation system 906 can comprise an application running on the server device(s) 902 or a portion of a software application that can be downloaded from the server device(s) 902. For example, the digital narrative animation system 906 can include a web hosting application that allows the designer device 910 and the client device 914 to interact with content hosted on the server device(s) 902. To illustrate, in one or more embodiments of the environment 900, the designer device 910 and the client device 914 access a web page supported by the server device(s) 902. In particular, the designer device 910 can run a designer application 912 to allow a designer to access, generate view, select, create, and/or modify data narratives within a web page or web site hosted at the server device(s) 902 (e.g., a web page enables a user to provide a static data graphic and a corresponding dataset, and receive, from the server, an interactive animated data narrative).

Although FIG. 9 illustrates a particular arrangement of the server device(s) 902, the designer device 910, the client device 914, and the network 908, various additional arrangements are possible. For example, while FIG. 9 illustrates the designer device 910 and the client device 914 communicating with the server device(s) 902 via the network 908, in one or more embodiments a single client device may communicate directly with the server device(s) 902, bypassing the network 908.

Similarly, although the environment 900 of FIG. 9 is depicted as having various components, the environment 900 may have additional or alternative components. For example, the digital narrative animation system 906 can be implemented on multiple computing devices. In particular, components of the digital narrative animation system 906 may be implemented in whole by the server device(s) 902 or digital narrative animation system 906 may be implemented in whole by the designer device 910 (e.g., the designer device 910 can receive static data graphics, receive corresponding datasets, store data graphics and datasets, and/or generate interactive animated data narratives utilizing the digital narrative animation system 906). Alternatively, components of the digital narrative animation system 906 may be implemented across multiple devices or components.

Figure 10:
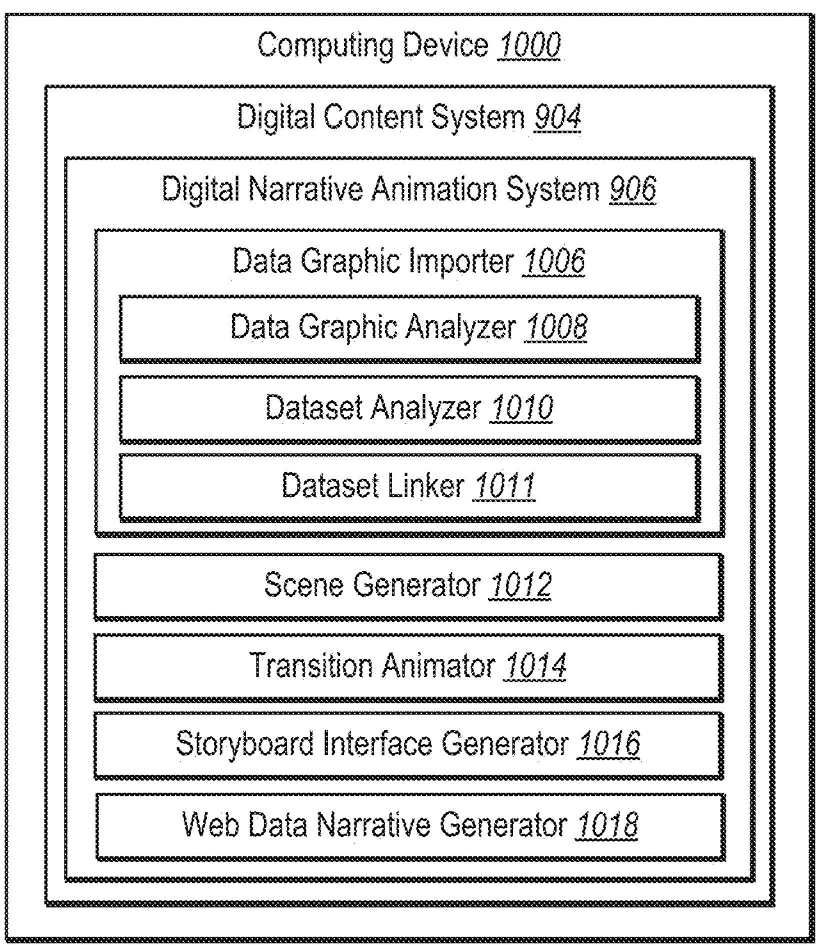
FIG. 10 illustrates a block diagram of an exemplary computing device for implementing one or more embodiments of the present disclosure.

Referring now to FIG. 10, additional detail is provided regarding capabilities and components of the digital narrative animation system 906 in accordance with one or more embodiments. In particular, FIG. 10 shows a schematic diagram of an example architecture of the digital narrative animation system 906 of a digital content management system 904 implemented on a computing device 1000 (e.g., the designer device 910, the client device 914, and/or the server device(s) 902). The digital narrative animation system 906 can represent one or more embodiments of the digital narrative animation system described previously.

As illustrated in FIG. 10, the digital narrative animation system 906 includes various components for performing the processes and features described herein. For example, the digital narrative animation system 906 includes a data graphic importer 1006, a scene generator 1012, a transition animator 1014, a storyboard interface generator 1016, and a web data narrative generator 1018. Each of these components is described below in turn.

As mentioned above, the digital narrative animation system 906 includes the data graphic importer 1006. In general, the data graphic importer 1006 facilitates identifying, accessing, receiving, obtaining, generating, and importing static data graphics. In one or more embodiments, the data graphic importer 1006 operates in connection with the digital content management system 904 to access data graphics. The data graphic importer 1006 includes a data graphic analyzer 1008 and a dataset analyzer 1010. The data graphic analyzer 1008 identifies graphical data elements within static data graphics. The dataset analyzer 1010 analyzes the corresponding data to identify values within the corresponding data. The data graphic analyzer 1008 and the dataset analyzer 1010 work together to determine links between the data graphic and the corresponding dataset.

As shown, the digital narrative animation system 906 includes the dataset linker 1011. In general the dataset linker 1011 identifies that individual static data graphics are linked to the same corresponding dataset. In particular, the dataset linker 1011 accesses a first dataset for a first data graphic and a second dataset for the second data graphic. The dataset linker 1011 compares the first dataset and the second dataset to determine that both data graphics are linked to the same dataset. As described above, based on this determination, the digital narrative animation system 906 can generate an animation between the data graphics linked to the same dataset.

As shown, the digital narrative animation system 906 includes the scene generator 1012. In general, the scene generator 1012 creates scenes comprising a data graphic, annotations, corresponding subsets of data, axis features, and other data. In particular, the scene generator 1012 generates a series of scenes, each associated with a data graphic, that make up an animated data narrative. The scene generator 1012 generates new scenes using imported static data graphics. Additionally, the scene generator 1012 generates new data graphics by generating a copy of an existing static data graphic and reorganizing values in the copy (or receiving a new data graphic).

As illustrated in FIG. 10, the digital narrative animation system 906 includes the transition animator 1014. In general, the transition animator 1014 generates data-driven transitions between scenes of a data narrative. In particular, the transition animator 1014 determines, from the corresponding dataset, the data graphic, and the links between the data graphic and the corresponding dataset which data values should be interpolated between scenes, which data values have left the scene, and which data values are entering the scene. Based on the data, the transition animator 1014 generates intermediate graphical data elements to simulate the data values moving between scenes, entering scenes, and/or leaving scenes.

The digital narrative animation system 906 includes the storyboard interface generator 1016. In general, the storyboard interface generator 1016 generates an interactive storyboard animation interface that allows designers to import, modify, reorder, and generate scenes and transitions between those scenes in a streamlined manner. Additionally, the storyboard interface generator 1016 generates interactive user interfaces that enable designers to view changes to scenes and transitions between the scenes. The storyboard interface generator 1016 also generates interfaces that enable designers to edit the data-driven transitions between scenes.

The digital narrative animation system 906 includes the web data narrative generator 1018. The web data narrative generator 1018 exports the animated data narrative as an interactive website. More particularly, the web data narrative generator 1018 exports the data narrative as a website comprising one of the following three interactive mechanisms: playback control, stepper buttons, or storytelling.

FIGS. 1-10, the corresponding text, and examples provide a number of different methods, systems, devices, and non-transitory computer-readable media of the digital narrative animation system 906. In addition to the foregoing, one or more embodiments can also be described in terms of flowcharts comprising acts for accomplishing a particular result, such as the flowcharts of acts shown in FIG. 11. Additionally, the acts described herein may be repeated or performed in parallel with one another or parallel with different instances of the same or similar acts.

Figure 11:
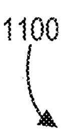
FIG. 11 illustrates a flowchart of a series of acts for animating a transition between scenes of a data narrative.
Figure 11:
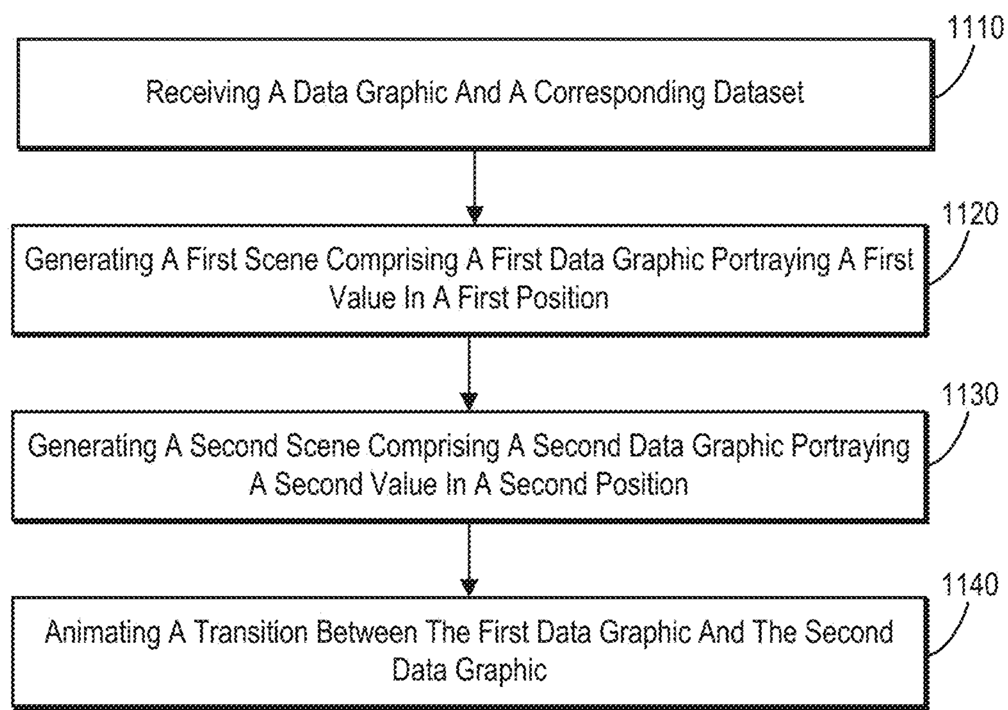

As mentioned, FIG. 11 illustrates a flowchart of a series of acts 1100 for generating a data-driven animation between two static data graphic scenes. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11

In one or more embodiments, the series of acts 1100 is implemented on one or more computing devices, such as the computing device 1000, the designer device 910, or the client device 914. In addition, in some embodiments, the series of acts 1100 is implemented in a digital environment for creating or editing animated data narratives.

The series of acts 1100 includes an act 1110 of receiving a data graphic and a corresponding dataset. In particular, the act 1110 can involve receiving at least one static data graphic and a corresponding dataset comprising a first value and a second value. The dataset in the act 1110 can comprise a plurality of data attributes with a plurality of data values. Additionally, the act 1110 can include the additional steps of providing a data attribute selection element and scene duration element for display via the storyboard animation user interface, based on user interaction with the data attribute selection element and the scene duration element: identifying a data attribute from the plurality of data attributes from the dataset and a scene duration for utilizing data values from the data attribute; accessing the dataset to identify the first value from the data attribute to generate the first scene comprising the first data graphic portraying the first graphical data element of the first value; and accessing the dataset to identify the second value from the data attribute utilizing the scene duration to generate the second scene comprising the first data graphic portraying the first graphical data element of the second value.

The act 1110 can also include the act of accessing the dataset to identify a plurality of additional values from the data attribute; generating a plurality of scenes comprising a plurality of data graphics based on the static data graphic, wherein the plurality of data graphics portray the plurality of values; and generating a plurality of transitions between the plurality of scenes based on the plurality of values.

The series of acts 1100 includes an act 1120 of generating a first scene comprising a first data graphic portraying a first value in a first position. In particular, the act 1120 can involve generate, for display via a storyboard animation user interface of a designer device, a first scene comprising a first data graphic based on the static data graphic, the first data graphic portraying a first graphical data element of the first value in a first position.

The series of acts 1100 includes an act 1130 of generating a second scene comprising a second data graphic portraying a second value in a second position. In particular, the act 1130 can involve generating, for display via a storyboard animation user interface of a designer device, a first scene comprising a first data graphic based on the static data graphic, the first data graphic portraying a first graphical data element of the first value in a first position.

The series of acts 1100 includes an act 1140 of animating a transition between the first data graphic and the second data graphic. In particular, the act 1140 can involve animating a transition between the first data graphic portraying the first value in the first position in the first scene and the second data graphic portraying the second value in the second position in the second scene utilizing the corresponding dataset. Specifically, the act 1140 can include animating a transition between the first data graphic portraying the first graphical data element of first value in the first position in the first scene and the second data graphic portraying the second graphical data element of the second value in the second position in the second scene utilizing the corresponding dataset.

The series of acts 1100 can include an additional act of determining a first link between the dataset and the first data graphic and a second link between the dataset and the second data graphic and generating the transition based on the determination of the first link and the second link.

The series of acts 1100 can include an additional act of generating a data animation comprising the first scene, the second scene, and the transition, wherein the data animation portrays the first scene with the first graphical data element of the first value in the first position, portrays the second scene with the second graphical data element of the second value in the second position, and portrays the transition with a plurality of intermediate graphical data elements in a plurality of intermediate positions between the first position and the second position. Specifically this additional act can include accessing the dataset to identify the first value and the second value and determining the plurality of intermediate graphical data elements and the plurality of intermediate positions based on the first value and the second value from accessing the dataset. Additionally, this additional act can include providing, for display via the storyboard animation user interface of the designer device, a plurality of client interactivity elements and based on user interaction with a first client interactivity element exporting the data animation to a website for display to one or more client devices such that the one or more client devices can control presentation of the data animation utilizing an interactive mechanism. The plurality of client interactivity elements in this additional act comprises at least one of: a playback control element, wherein the interactive mechanism comprises selectable playback elements for playing and pausing a data narrative via the website; a stepper control element, wherein the interactive mechanism comprises selectable stepper elements that allow the client device to select scenes in the data narrative via the website; and a scrollytelling control element, wherein the interactive mechanism comprises a scrollytelling feature that controls playback of the data narrative based on a scroll event corresponding to the web site.

The series of acts 1100 can also include the act of determining that the second scene portrays the first value in a transitioned position; and based on the dataset, the transitioned position, and the first position, generating a first value animation from the first position to the transitioned position.

In addition (or in the alternative) to the acts described above, in some embodiments, the acts 1100 include performing a step for utilizing the dataset to generate a transition between the first scene and the second scene portraying the first version of the data graphic and the second version of the data graphic. For example, the acts and algorithms described in reference to FIG. 3 can comprise the corresponding acts and algorithms (e.g., structure) for performing a step for utilizing the dataset to generate a transition between the first scene and the second scene portraying the first version of the data graphic and the second version of the data graphic. Additionally, FIGS. 4A-5D provide additional detail regarding the acts and algorithms described in FIG. 3 and can further comprise corresponding acts and algorithms (e.g., structure) for performing a step for utilizing the dataset to generate a transition between the first scene and the second scene portraying the first version of the data graphic and the second version of the data graphic.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
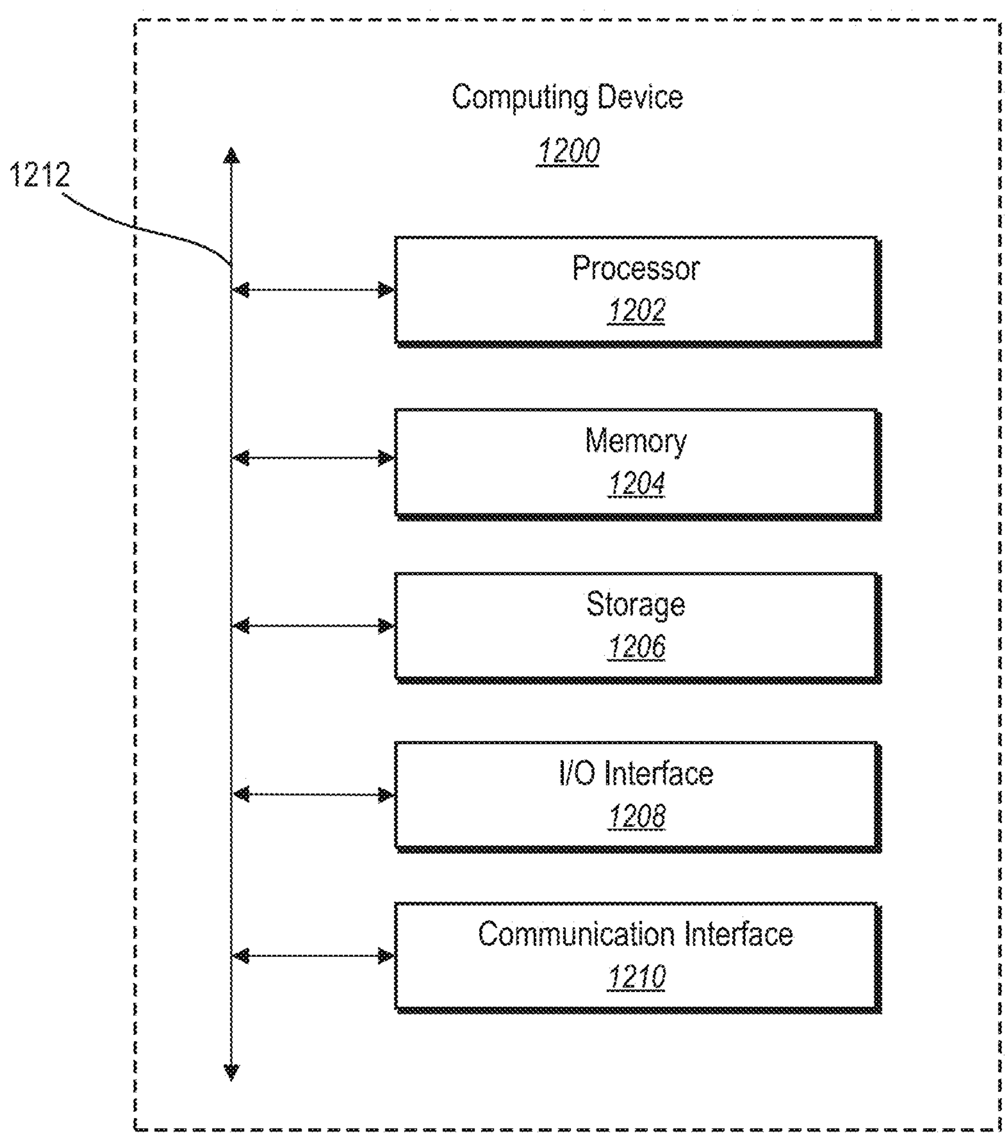
FIG. 12 illustrates a block diagram of an exemplary computing device for implementing one or more embodiments of the present disclosure.

FIG. 12 illustrates a block diagram of an exemplary computing device 1200 that may be configured to perform one or more of the processes described above. One will appreciate that one or more computing devices, such as the computing device 1200 may represent the computing devices described above (e.g., computing device 1000, server device(s) 902, and client devices 1204*a-b*). In one or more embodiments, the computing device 1200 may be a mobile device (e.g., a laptop, a tablet, a smartphone, a mobile telephone, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output ("I/O") interfaces 1208, and a communication interface 1211, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to:

receive a static data graphic and a corresponding dataset comprising one or more data attributes;

based on interaction with a data ticker element, provide, for display via a storyboard animation user interface of a designer device, a data ticker configuration window comprising a data attribute selection element indicating an independent variable to vary across a narrative duration and a scene duration selection element;

receive a selection of a data attribute of the one or more data attributes based on user interaction with the data attribute selection element and a scene duration based on user interaction with the scene duration selection element; and automatically generate a data narrative that varies the independent variable across the narrative duration based on the data attribute and the scene duration by:

generating a series of data graphics and transitions between the series of data graphics based on the corresponding dataset and utilizing the data attribute as the independent variable that sequentially iterates between each data graphic within the series of data graphics by:

generating a first scene portraying a first value of the independent variable and remaining data attribute values corresponding to the first value of the independent variable; and generating a second scene portraying a second value of the independent variable and remaining data attribute values corresponding to the second value of the independent variable; and displaying each data graphic of the series of data graphics and the transitions for the scene duration.

2. The non-transitory computer readable medium of claim 1, further comprising instructions that, when executed by the at least one processor, cause the computing device to:

receive the corresponding dataset by receiving the independent variable and at least one additional variable that changes relative to the independent variable; and automatically generate the data narrative that varies the independent variable with the at least one additional variable across the narrative duration.

3. The non-transitory computer readable medium of claim 2, further comprising instructions that, when executed by the at least one processor, cause the computing device to generate, based on the user interaction, a data animation comprising a first scene corresponding to a first data graphic of the series of data graphics portraying a first independent variable value and a first additional variable value, a second scene corresponding to a second data graphic of the series of data graphics portraying a second independent variable value and a second additional variable value, and a transition, wherein the data animation:

portrays the first scene with a first graphical data element of the first additional variable value in a first position;

portrays the second scene with a second graphical data element of the second additional variable value in a second position; and portrays the transition with a plurality of intermediate graphical data elements in a plurality of intermediate positions between the first position and the second position.

4. The non-transitory computer readable medium of claim 1, wherein the independent variable comprises time and further comprising instructions that, when executed by the at least one processor, cause the computing device to generate the series of data graphics by:

generating a first scene portraying a first time value from the corresponding dataset and remaining data attribute values corresponding to the first time value from the corresponding dataset; and generating a second scene portraying a second time value and remaining data attribute values corresponding to the second time value from the corresponding dataset.

5. The non-transitory computer readable medium of claim 1, further comprising instructions that, when executed by the at least one processor, cause the computing device to, based on the selection of the data attribute and the scene duration, generate a plurality of additional scenes within the series of data graphics.

6. The non-transitory computer readable medium of claim 1, further comprising instructions that, when executed by the at least one processor, cause the computing device to provide, for display via the storyboard animation user interface and based on user interaction with a transition indicator element, a transition animation information interface for modifying the transitions between data graphics in the series of data graphics.

7. The non-transitory computer readable medium of claim 1, wherein the corresponding dataset comprises a plurality of data attributes with a plurality of data values and further comprising instructions that, when executed by the at least one processor, cause the computing device to provide, for display within the data ticker configuration window, data narrative information comprising at least one of a range of attributes to be included in the data narrative, a number of scenes in the data narrative, or a total duration of the data narrative based on a currently selected data attribute and a currently selected scene duration.

8. The non-transitory computer readable medium of claim 1, further comprising instructions that, when executed by the at least one processor, cause the computing device to, generate the series of data graphics by:

accessing the corresponding dataset to identify a first value from the data attribute to generate a first scene comprising a first data graphic portraying a first graphical data element of the first value; and accessing the corresponding dataset to identify a second value from the data attribute to generate a second scene comprising the first data graphic portraying the first graphical data element of the second value.

9. The non-transitory computer readable medium of claim 1, further comprising instructions that, when executed by the at least one processor, cause the computing device to:

based on user selection of a timeline view element, provide, for display via the designer device a template animations interface comprising a timeline objects element and a timeline properties element;

ordering data driven animations for graphical data elements corresponding to the series of data graphics based on user interaction with the timeline objects element; and modifying visual properties of the data graphics in the series of data graphics based on user interaction with the timeline properties element.

10. A system comprising:

at least one processor; and a computer readable storage medium storing instructions that, when executed by the at least one processor, cause the system to:

receive a static data graphic and a corresponding dataset comprising a one or more data attributes;

based on interaction with a data ticker element, provide, for display via a storyboard animation user interface of a designer device, a data ticker configuration window comprising a data attribute selection element indicating an independent variable to vary across a narrative duration and a scene duration selection element;

receive a selection of a data attribute of the one or more data attributes based on user interaction with the data attribute selection element and a scene duration based on user interaction with the scene duration selection element; and automatically generate a data narrative that varies the independent variable across the narrative duration based on the data attribute and the scene duration by:

generating a series of data graphics and transitions between the series of data graphics based on the corresponding dataset and utilizing the data attribute as the independent variable that sequentially iterates between each data graphic within the series of data graphics by:

generating a first scene portraying a first value of the independent variable and remaining data attribute values corresponding to the first value of the independent variable; and generating a second scene portraying a second value of the independent variable and remaining data attribute values corresponding to the second value of the independent variable; and displaying each data graphic of the series of data graphics and the transitions for the scene duration.

11. The system of claim 10, further comprising generating a data animation between a first scene corresponding to a first data graphic of the series of data graphics and a second scene corresponding to a second data graphic of the series of data graphics, wherein the data animation:

portrays the first scene with a first graphical data element of a first value in a first position;

portrays the second scene with a second graphical data element of a second value in a second position; and portrays a transition with a plurality of intermediate graphical data elements between the first value and the second value in a plurality of intermediate positions between the first position and the second position.

12. The system of claim 11, further comprising instructions that, when executed by the at least one processor, cause the system to generate the plurality of intermediate graphical data elements based on the first value and the second value identified from accessing the corresponding dataset.

13. The system of claim 11, further comprising instructions that, when executed by the at least one processor, cause the system to generate the series of data graphics by generating a set of sequential scenes portraying sequentially iterating values of the independent variable and corresponding values of remaining data attributes.

14. The system of claim 13, further comprising instructions that, when executed by the at least one processor, cause the system to provide, for display via the storyboard animation user interface of the designer device, a plurality of client interactivity elements corresponding with one or more interactive mechanisms, wherein the plurality of client interactivity elements comprises at least one of:

a playback control element corresponding with an interactive mechanism comprising selectable playback elements for playing and pausing the data narrative via a website;

a stepper control element corresponding with an interactive mechanism comprising selectable stepper elements that allow one or more client devices to select scenes in the data narrative via the website; and a scrollytelling control element corresponding with an interactive mechanism comprising a scrollytelling feature that controls playback of the data narrative based on a scroll event corresponding to the website.

15. The system of claim 11, further comprising instructions that, when executed by the at least one processor, cause the system to provide, for display within the data ticker configuration window, data narrative information comprising a range of values of the independent variable to be included in the data narrative.

16. The system of claim 11, wherein the independent variable comprises time and further comprising instructions that, when executed by the at least one processor, cause the system to generate the series of data graphics by:

generating a first scene portraying a first time value from the corresponding dataset and remaining data attribute values corresponding to the first time value from the corresponding dataset; and generating a second scene portraying a second time value and remaining data attribute values corresponding to the second time value from the corresponding dataset.

17. A method of generating interactive, digital data narrative animations comprising:

receiving a static data graphic and a corresponding dataset comprising one or more data attributes;

based on interaction with a data ticker element, providing, for display via a storyboard animation user interface of a designer device, a data ticker configuration window comprising a data attribute selection element and a scene duration selection element;

receiving a selection of a data attribute of the one or more data attributes based on user interaction with the data attribute selection element indicating an independent variable to vary across a narrative duration and a scene duration based on user interaction with the scene duration selection element; and automatically generating a data narrative that varies the independent variable across the narrative duration based on the data attribute and the scene duration by:

generating a series of data graphics and transitions between the series of data graphics based on the corresponding dataset and utilizing the data attribute as the independent variable that sequentially iterates between each data graphic within the series of data graphics by:

generating a first scene portraying a first value of the independent variable and remaining data attribute values corresponding to the first value of the independent variable; and generating a second scene portraying a second value of the independent variable and remaining data attribute values corresponding to the second value of the independent variable; and displaying each data graphic of the series of data graphics and the transitions for the scene duration.

18. The method of claim 17, further comprising generating a data animation between a first scene corresponding to a first data graphic of the series of data graphics and a second scene corresponding to a second data graphic of the series of data graphics, wherein the data animation:

portrays the first scene with a first graphical data element of a first value in a first position;

portrays the second scene with a second graphical data element of a second value in a second position; and portrays a transition with a plurality of intermediate graphical data elements between the first value and the second value in a plurality of intermediate positions between the first position and the second position.

19. The method of claim 18, further comprising:

providing, for display via the storyboard animation user interface, a plurality of client interactivity elements; and based on user interaction with a first client interactivity element, exporting the data narrative to a website for display to one or more client devices such that the one or more client devices can control presentation of the data animation utilizing an interactive mechanism.

20. The method of claim 19, wherein the plurality of client interactivity elements comprises at least one of:

a playback control element, wherein the interactive mechanism comprises selectable playback elements for playing and pausing the data narrative via the website;

a stepper control element, wherein the interactive mechanism comprises selectable stepper elements that allow the one or more client devices to select scenes in the data narrative via the website; and a scrollytelling control element, wherein the interactive mechanism comprises a scrollytelling feature that controls playback of the data narrative based on a scroll event corresponding to the website.

* * * * *